US009424444B2

(12) United States Patent
Swink et al.

(10) Patent No.: US 9,424,444 B2
(45) Date of Patent: Aug. 23, 2016

(54) SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY

(75) Inventors: Cristy Swink, Milton, GA (US); Jason Sikes, Carnation, WA (US); Benjamin Fineman, San Francisco, CA (US); Jonathan Solis Snydal, Oakland, CA (US); Matthew James Schoenholz, Austin, TX (US); Craig Alan Williams, Stockton, CA (US); David Merkoski, San Francisco, CA (US); Claudia Knop, Atlanta, GA (US); Alex Tam, San Francisco, CA (US); Alison Rae Maiorano, San Francisco, CA (US); Christopher Marshall Turitzin, San Francisco, CA (US); Dhana Dhanasarnsombat, San Mateo, CA (US); Eric Brady Burns, San Francisco, CA (US); Hannah Regier, Berkeley, CA (US); Jennifer Siu Bettendorff, San Francisco, CA (US); Karin Maire Curkowicz, San Jose, CA (US); Katrin Asen, San Francisco, CA (US); Harry Lawson Kight, San Francisco, CA (US); Flora Elysia Howell, Iron Station, NC (US); Megan Elisabeth Shia, San Francisco, CA (US); Paul McDougall, San Francisco, CA (US); Philip Foeckler, Richmond, CA (US); Ratna Desai, Oakland, CA (US); Sara Louise Todd, San Francisco, CA (US); Thomas L Rohrer, San Anselmo, CA (US)

(73) Assignee: AT&T MOBILITY II LLC, Atlanta, GA (US)

( * ) Notice: Subject to any disclaimer, the term of this patent is extended or adjusted under 35 U.S.C. 154(b) by 40 days.

(21) Appl. No.: 12/643,726

(22) Filed: Dec. 21, 2009

(65) Prior Publication Data

US 2011/0087970 A1 Apr. 14, 2011

Related U.S. Application Data

(60) Provisional application No. 61/251,717, filed on Oct. 14, 2009.

(51) Int. Cl.
*G06F 3/00* (2006.01)
*G06F 21/84* (2013.01)
(Continued)

(52) U.S. Cl.
CPC ............ *G06F 21/84* (2013.01); *G06F 21/575* (2013.01); *H04L 51/16* (2013.01); *H04L 51/32* (2013.01);
(Continued)

(58) Field of Classification Search
USPC .................. 715/752, 739; 705/319; 345/173
See application file for complete search history.

(56) References Cited

U.S. PATENT DOCUMENTS 5,072,412 A 12/1991 Henderson, Jr. et al.
5,233,687 A 8/1993 Henderson, Jr. et al.
(Continued)

FOREIGN PATENT DOCUMENTS

WO 2008107675 9/2008

OTHER PUBLICATIONS

Spagnuolo-Tweetdeck, http://edgehopper.com/how-to-use-tweetdeck-the-ultimate-twitter-client/, Feb. 12, 2009, 11 pages.*
(Continued)

*Primary Examiner* — Toan Vu
(74) *Attorney, Agent, or Firm* — Amin, Turocy & Watson, LLP

(57) ABSTRACT

Systems, apparatus and methods are provided. In some embodiments, a computer-implemented method is provided. The computer-implemented method can include executing, using at least one processor, computer-readable instructions for performing various acts. The acts can include executing at least two applications, wherein at least one of the two applications is for providing social media information. The acts can also include receiving a signal in response to a detected input gesture indicative of a selection of an entity. The selection of the entity can be performed via another one of the two applications. The acts can also include integrating the two applications such that social media information is generated about the entity. The integration can be in response to receiving the signal, and the social media information can include information from one or more social networking websites. The acts can also include displaying the social media information about the entity.

20 Claims, 13 Drawing Sheets

(51) Int. Cl.

| | | |
|---|---|---|
| *G06F 21/57* | (2013.01) | |
| *H04L 12/58* | (2006.01) | |
| *H04M 1/725* | (2006.01) | |
| *H04W 4/12* | (2009.01) | |
| *H04W 4/14* | (2009.01) | |
| *G06F 3/01* | (2006.01) | |

(52) U.S. Cl.
CPC ....... *H04M 1/7255* (2013.01); *H04M 1/72552* (2013.01); *H04M 1/72555* (2013.01); *H04W 4/12* (2013.01); *H04W 4/14* (2013.01); *G06F 2221/031* (2013.01); *G06F 2221/2113* (2013.01); *G06F 2221/2141* (2013.01); *H04L 51/28* (2013.01)

(56) References Cited

U.S. PATENT DOCUMENTS

| | | | |
|---|---|---|---|
| 5,394,521 | A | 2/1995 | Henderson, Jr. et al. |
| 5,838,326 | A | 11/1998 | Card et al. |
| 5,847,709 | A | 12/1998 | Card et al. |
| 6,269,369 | B1 | 7/2001 | Robertson |
| 6,367,020 | B1 | 4/2002 | Klein |
| 6,401,209 | B1 | 6/2002 | Klein |
| 7,269,727 | B1 | 9/2007 | Mukherjee et al. |
| 7,286,063 | B2 | 10/2007 | Gauthey et al. |
| 7,308,926 | B1 | 12/2007 | Hawkins |
| 7,322,626 | B2 | 1/2008 | Thomas |
| 7,324,333 | B2 | 1/2008 | Allen |
| 7,376,669 | B2 | 5/2008 | Klein |
| 7,443,665 | B2 | 10/2008 | Allen |
| 7,453,443 | B2 | 11/2008 | Rytivaara et al. |
| 7,478,436 | B1 | 1/2009 | Shieh et al. |
| 7,606,024 | B2 | 10/2009 | Boss et al. |
| 7,620,982 | B2 | 11/2009 | Ishidera |
| 7,628,335 | B2 | 12/2009 | Morimoto et al. |
| 7,636,033 | B2 | 12/2009 | Golden |
| 7,640,293 | B2 | 12/2009 | Wilson et al. |
| 7,657,849 | B2 | 2/2010 | Chaudhri et al. |
| 7,761,814 | B2 * | 7/2010 | Rimas-Ribikauskas et al. ............. 715/863 |
| 7,933,609 | B2 | 4/2011 | Lagerstedt et al. |
| 7,953,859 | B1 | 5/2011 | Kiefhaber et al. |
| 8,108,781 | B2 | 1/2012 | Laansoo et al. |
| 8,316,095 | B1 | 11/2012 | Wheeler et al. |
| 8,484,564 | B1 * | 7/2013 | Marti et al. ................ 715/733 |
| 8,543,927 | B1 | 9/2013 | McKinley et al. |
| 8,676,901 | B1 | 3/2014 | Nicolaou et al. |
| 2001/0044903 | A1 | 11/2001 | Yamamoto et al. |
| 2002/0056046 | A1 | 5/2002 | Klein |
| 2002/0077079 | A1 | 6/2002 | Ishihara |
| 2002/0099960 | A1 | 7/2002 | Klein |
| 2002/0114654 | A1 | 8/2002 | Abe |
| 2003/0023688 | A1 | 1/2003 | Denenberg et al. |
| 2003/0025840 | A1 | 2/2003 | Arling |
| 2003/0074575 | A1 | 4/2003 | Hoberock et al. |
| 2003/0074590 | A1 | 4/2003 | Fogle et al. |
| 2003/0120957 | A1 | 6/2003 | Pathiyal |
| 2003/0172495 | A1 | 9/2003 | Pan |
| 2003/0184592 | A1 * | 10/2003 | Awada et al. ................ 345/788 |
| 2003/0191960 | A1 | 10/2003 | Hung-yi |
| 2003/0206224 | A1 | 11/2003 | Sakakibara et al. |
| 2004/0034561 | A1 | 2/2004 | Smith |
| 2004/0046018 | A1 | 3/2004 | Dobbins |
| 2004/0082322 | A1 | 4/2004 | Tani |
| 2004/0085351 | A1 | 5/2004 | Tokkonen |
| 2004/0092247 | A1 | 5/2004 | Tani |
| 2004/0113491 | A1 | 6/2004 | Mauser et al. |
| 2004/0113819 | A1 * | 6/2004 | Gauthey et al. ............. 341/34 |
| 2004/0123135 | A1 | 6/2004 | Goddard |
| 2004/0137884 | A1 | 7/2004 | Engstrom et al. |
| 2004/0189439 | A1 | 9/2004 | Cansino |
| 2004/0220913 | A1 | 11/2004 | Walker |
| 2005/0085215 | A1 | 4/2005 | Kokko et al. |
| 2005/0117564 | A1 | 6/2005 | Vieri et al. |
| 2005/0234910 | A1 | 10/2005 | Buchheit et al. |
| 2005/0253817 | A1 | 11/2005 | Rytivaara et al. |
| 2005/0282135 | A1 | 12/2005 | Berman |
| 2006/0012577 | A1 | 1/2006 | Kyrola |
| 2006/0075250 | A1 | 4/2006 | Liao |
| 2006/0101350 | A1 | 5/2006 | Scott |
| 2006/0123347 | A1 | 6/2006 | Hewitt et al. |
| 2006/0176661 | A1 | 8/2006 | Allen |
| 2006/0184351 | A1 | 8/2006 | Corston-Oliver et al. |
| 2006/0195474 | A1 | 8/2006 | Cadiz et al. |
| 2006/0253371 | A1 | 11/2006 | Rutt et al. |
| 2006/0255907 | A1 | 11/2006 | Min |
| 2006/0271526 | A1 | 11/2006 | Charnock et al. |
| 2006/0282772 | A1 | 12/2006 | Chamberlin et al. |
| 2006/0291157 | A1 | 12/2006 | Allen |
| 2006/0291158 | A1 | 12/2006 | Allen |
| 2007/0022163 | A1 | 1/2007 | Wormald et al. |
| 2007/0085839 | A1 | 4/2007 | Yang et al. |
| 2007/0088687 | A1 | 4/2007 | Bromm et al. |
| 2007/0119952 | A1 | 5/2007 | Morimoto et al. |
| 2007/0133771 | A1 | 6/2007 | Stifelman et al. |
| 2007/0133802 | A1 | 6/2007 | Yuan |
| 2007/0135091 | A1 | 6/2007 | Wassingbo |
| 2007/0144225 | A1 | 6/2007 | Tamura |
| 2007/0150842 | A1 | 6/2007 | Chaudhri et al. |
| 2007/0161410 | A1 | 7/2007 | Huang et al. |
| 2007/0203982 | A1 | 8/2007 | Jagoe et al. |
| 2007/0204064 | A1 | 8/2007 | Mail et al. |
| 2007/0220542 | A1 | 9/2007 | Kim |
| 2007/0247276 | A1 | 10/2007 | Murchison et al. |
| 2007/0274300 | A1 | 11/2007 | Chu et al. |
| 2007/0282839 | A1 | 12/2007 | Walker |
| 2008/0036743 | A1 * | 2/2008 | Westerman et al. ........ 345/173 |
| 2008/0036747 | A1 | 2/2008 | Hope |
| 2008/0049135 | A1 | 2/2008 | Okudaira |
| 2008/0055269 | A1 | 3/2008 | Lemay et al. |
| 2008/0055276 | A1 | 3/2008 | Chang |
| 2008/0059880 | A1 | 3/2008 | Cato et al. |
| 2008/0064370 | A1 | 3/2008 | Fukaya et al. |
| 2008/0089587 | A1 * | 4/2008 | Kim et al. ................ 382/190 |
| 2008/0122796 | A1 | 5/2008 | Jobs et al. |
| 2008/0153459 | A1 | 6/2008 | Kansal et al. |
| 2008/0182563 | A1 * | 7/2008 | Wugofski et al. .......... 455/414.2 |
| 2008/0189122 | A1 * | 8/2008 | Coletrane et al. ............... 705/1 |
| 2008/0189623 | A1 | 8/2008 | Patil |
| 2008/0207166 | A1 | 8/2008 | Aerrabotu et al. |
| 2008/0222636 | A1 | 9/2008 | Wang et al. |
| 2008/0229397 | A1 | 9/2008 | Basner et al. |
| 2008/0256170 | A1 * | 10/2008 | Hayashi et al. ............. 709/201 |
| 2008/0281610 | A1 * | 11/2008 | Yoshida et al. ................. 705/1 |
| 2009/0006991 | A1 * | 1/2009 | Lindberg et al. ............. 715/763 |
| 2009/0029674 | A1 | 1/2009 | Brezina et al. |
| 2009/0034804 | A1 | 2/2009 | Cho et al. |
| 2009/0040018 | A1 | 2/2009 | Lee et al. |
| 2009/0044578 | A1 | 2/2009 | Boss et al. |
| 2009/0061823 | A1 | 3/2009 | Chu |
| 2009/0064055 | A1 * | 3/2009 | Chaudhri ............ G06F 3/04817 715/863 |
| 2009/0066489 | A1 | 3/2009 | Golden |
| 2009/0102803 | A1 | 4/2009 | Newman et al. |
| 2009/0104925 | A1 | 4/2009 | Aula |
| 2009/0106415 | A1 * | 4/2009 | Brezina et al. .............. 709/224 |
| 2009/0119678 | A1 | 5/2009 | Shih et al. |
| 2009/0128335 | A1 | 5/2009 | Leung |
| 2009/0138562 | A1 | 5/2009 | Schmulen et al. |
| 2009/0157732 | A1 | 6/2009 | Hao et al. |
| 2009/0167717 | A1 | 7/2009 | Wang et al. |
| 2009/0170553 | A1 | 7/2009 | Wang et al. |
| 2009/0177981 | A1 | 7/2009 | Christie et al. |
| 2009/0187676 | A1 | 7/2009 | Griffin et al. |
| 2009/0209235 | A1 | 8/2009 | Lawler et al. |
| 2009/0215479 | A1 | 8/2009 | Karmarkar |
| 2009/0217211 | A1 * | 8/2009 | Hildreth et al. .............. 715/863 |
| 2009/0234935 | A1 | 9/2009 | Watson et al. |
| 2009/0245484 | A1 | 10/2009 | Bates |
| 2009/0248844 | A1 * | 10/2009 | Sommer et al. ............. 709/223 |
| 2009/0259968 | A1 | 10/2009 | Hsieh et al. |
| 2009/0264117 | A1 | 10/2009 | Hsieh et al. |
| 2009/0264157 | A1 | 10/2009 | Hsieh et al. |

(56) References Cited

U.S. PATENT DOCUMENTS

| | | | |
|---|---|---|---|
| 2009/0265666 A1 | 10/2009 | Hsieh et al. | |
| 2009/0288032 A1 | 11/2009 | Chang et al. | |
| 2009/0296913 A1 | 12/2009 | Thomas et al. | |
| 2009/0327263 A1 | 12/2009 | Maghoul et al. | |
| 2010/0009727 A1 | 1/2010 | Presutti | |
| 2010/0071423 A1 | 3/2010 | Dehaan et al. | |
| 2010/0079380 A1 | 4/2010 | Nurmi | |
| 2010/0082684 A1* | 4/2010 | Churchill et al. | 707/784 |
| 2010/0094939 A1* | 4/2010 | Cheng et al. | 709/206 |
| 2010/0105440 A1* | 4/2010 | Kruzeniski et al. | 455/566 |
| 2010/0123724 A1* | 5/2010 | Moore | G06F 3/04817 345/473 |
| 2010/0127998 A1 | 5/2010 | Hyun | |
| 2010/0145951 A1 | 6/2010 | Van Coeverden De Groot et al. | |
| 2010/0156594 A1 | 6/2010 | Chaikin et al. | |
| 2010/0159944 A1 | 6/2010 | Pascal et al. | |
| 2010/0159995 A1* | 6/2010 | Stallings et al. | 455/566 |
| 2010/0162133 A1 | 6/2010 | Pascal et al. | |
| 2010/0164740 A1 | 7/2010 | Lo et al. | |
| 2010/0199359 A1 | 8/2010 | Miki | |
| 2010/0207723 A1 | 8/2010 | Cao et al. | |
| 2010/0214237 A1* | 8/2010 | Echeverri et al. | 345/173 |
| 2010/0223097 A1 | 9/2010 | Kramer et al. | |
| 2010/0235733 A1* | 9/2010 | Drislane | G06F 3/04883 715/702 |
| 2010/0241971 A1* | 9/2010 | Zuber | 715/753 |
| 2010/0251116 A1* | 9/2010 | Rimas-Ribikauskas et al. | 715/702 |
| 2010/0257490 A1* | 10/2010 | Lyon et al. | 715/863 |
| 2010/0309149 A1 | 12/2010 | Blumenberg et al. | |
| 2010/0317335 A1* | 12/2010 | Borovsky et al. | 455/419 |
| 2010/0325155 A1 | 12/2010 | Skinner et al. | |
| 2011/0035673 A1* | 2/2011 | Chou et al. | 715/739 |
| 2011/0035708 A1* | 2/2011 | Damale | 715/863 |
| 2011/0062143 A1 | 3/2011 | Satanek | |
| 2011/0081922 A1 | 4/2011 | Chandra et al. | |
| 2011/0169909 A1 | 7/2011 | Gu | |
| 2011/0179387 A1* | 7/2011 | Shaffer | G06F 3/04883 715/835 |
| 2012/0030287 A1* | 2/2012 | Leonard | 709/204 |
| 2012/0303712 A1* | 11/2012 | Polis et al. | 709/204 |
| 2012/0319985 A1* | 12/2012 | Moore et al. | 345/173 |
| 2013/0205243 A1* | 8/2013 | Rivera | G06F 3/04817 715/776 |
| 2014/0082557 A1* | 3/2014 | Warner | G06F 3/0482 715/834 |
| 2014/0258897 A1* | 9/2014 | Shiplacoff | G06F 3/0484 715/764 |
| 2015/0193132 A1* | 7/2015 | Fagans | G06F 3/0481 715/838 |

OTHER PUBLICATIONS

A Teenager's Dream: An iPhone App for Free Texting—Bits Blog—NYTimes.com. http://bits.blogs.nytimes.com/2009/08/25/a-teens-dream-an-iphone-app-for-free-texting/ Last accessed Oct. 13, 2009, 19 pages.

Build and grow with Facebook Connect. http://developers.facebook.com/connect.php? tab=website. Last accessed Nov. 2, 2009, 2 pages.

Build and grow with Facebook Connect. http://developers.facebook.com/connect.php?tab=iphone Last accessed Nov. 2, 2009, 1 page.

http://www.sprint.com/cdma/assets/pdfs/phone_guides/palm/palm_pre_p100_ug.pdf at pp. 44, 57-58. Last accessed Nov. 6, 2009, 3 pages.

MTN—Meeting the needs of the South African market for a new mobile messaging solution—Mobile IM. http://www.moviuscorp.com/files/case_study_mtn.pdf. Last accessed Nov. 2, 2009, 5 pages.

http://www.bizzia.com/buzznetworker/social-web-aggregation Last accessed Nov. 6, 2009, 4 pages.

Alexander The Late. http://alexanderthelate.wordpress.com/2008/02/11/social-media-aggregation-lifestreaming-all-of-your-web-activity-in-one-simple-and-potentially-inconvenient-place/. Last accessed Nov. 3, 2009, 3 pages.

Schroeder, 20 Ways to Aggregate Your Social Networking Profiles, http://mashable.com/2007/07/17/social-network-aggregators/, Jul. 17th, 2007, 20 pages.

Hirsch, iPhone 2.0 Apps: The Social Networking App Comparison, http://mashable.com/2008/07/17/iphone-social-networking-app-comparison/, Jul. 17, 2008, 9 pages.

Lifestream: Bebo's new social media aggregation tool | Media | guardian.co.uk, http://www.guardian.co.uk/media/pda/2009/feb/23/socialnetworking-bebo, Last accessed Nov. 6, 2009, 3 pages.

Wikipedia, Social network aggregation—Wikipedia, the free encyclopedia, http://en.wikipedia.org/wiki/Social_Network_Aggregation, Last accessed Nov. 6, 2009, 3 pages.

Jaiku | Your Conversation, www.jaiku.com, Last accessed Nov. 6, 2009, 3 pages.

StumbleUpon.com: Personalized Recommendations to Help You Discover the Best of the . . . , www.stumbleupon.com, Last accessed Nov. 6, 2009, 2 pages.

The Walt Disney Internet Group, www.dig.com, Last accessed Nov. 6, 2009, 1 page.

Delicioussocial bookmarking, www.del.icio.us, Last accessed Nov. 6, 2009, 6 pages.

Google Wave—Wikipedia, the free encyclopedia, http://en.wikipedia.org/wiki/Google_wave, Last accessed Dec. 18, 2009, 5 pages.

Motorola Backflip™—Wireless from AT&T, http://www.wireless.att.com/cell-phone-service/cell-phone-sales/promotion/motobackflip.jsp, Last Accessed Mar. 29, 2010, 2 pages.

Motoblur—Motorola USA, http://www.motorola.com/Consumers/US-EN/Consumer-Product-and-Services/ Motobl . . . , Last Accessed Mar. 29, 2010, 3 pages.

"Global Framework—UE Flows and Screen Details". AT&T Armstrong Project. Version 1.10. Last accessed Jun. 16, 2010, 166 pages.

"Global Framework—VD Specification". AT&T Armstrong project. Version 1.11. Last accessed Jun. 16, 2010, 117 pages.

"Phone Top—UE Flows and Screen Details". AT&T Armstrong Project. Version 1.18. Last accessed Jun. 16, 2010, 104 pages.

"Phone Top—VD Specification". AT&T Armstrong Project. Version 1.12. Last accessed Jun. 16, 2010, 52 pages.

"Phone / Dailer—UE Flows and Screen Details". AT&T Armstrong Project. Version 1.8. Last accessed Jun. 16, 2010, 57 pages.

"Dialer—VD Specification". AT&T Armstrong Project. Version 1.7. Last accessed Jun. 16, 2010, 19 pages.

"Contacts—UE Flows and Screen Details". AT&T Armstrong Project. Version 2.6. Last accessed Jun. 16, 2010, 142 pages.

"Contact—VD Specification". AT&T Armstrong Project. Version 2.2. Last accessed Jun. 16, 2010. 48 pages.

"Third-Party Pickers—UE Flows and Screen Details". AT&T Armstrong Project. Version 1.1. Last accessed Jun. 16, 2010, 23 pages.

"3rd Party Pickers". AT&T C@lumbus Project. Version 1.1. Last accessed Jun. 16, 2010, 7 pages.

"Social—UE Flows and Screen Details". AT&T C@lumbus Project. Version 1.5. Last accessed Jun. 16, 2010, 107 pages.

"Social—VD Specification". AT&T C@lumbus Project. Version 1.5. Last accessed Jun. 16, 2010, 39 pages.

"Media App—UE Flows and Screen Details". AT&T Armstrong Project. Version 1.6. Last accessed Jun. 16, 2010, 118 pages.

"Media—VD Specification". AT&T Armstrong Project. Version 1.3. Last accessed Jun. 16, 2010, 29 pages.

"Mobile Share—Reduced Scope; UE Flows and Screen Details". AT&T Armstrong Project. Version 1.2 RS. Last accessed Jun. 16, 2010, 59 pages.

"Mobile Share (Reduced Scope)". AT&T Armstrong Project. Version 1.2RS. Last accessed Jun. 16, 2010, 15 pages.

"Camera App—UE Flows and Screen Details". AT&T Armstrong Project. Version 1.8. Last accessed Jun. 16, 2010, 77 pages.

"Camera—VD Specification". AT&T Project. Version 1.8. Last accessed Jun. 16, 2010, 22 pages.

(56) References Cited

OTHER PUBLICATIONS

"Alarm Clock—UE Flows and Screen Details". AT&T Armstrong Project. Version 1.4. Last accessed Jun. 16, 2010, 35 pages.
"Alarm Clock—VD Specification". AT&T Armstrong Project. Version 1.4. Last accessed Jun. 16, 2010, 18 pages.
"Settings—UE Flows and Screen Details". AT&T Armstrong Project. Version 1.18. Last accessed Jun. 16, 2010, 180 pages.
"Settings—VD Specification". AT&T Armstrong Project. Version 1.8. Last accessed Jun. 16, 2010, 40 pages.
"Conversations—UE Flows and Screen Details". AT&T Armstrong Project. Version 1.3. Last accessed Jun. 16, 2010, 148 pages.
"Conversations". AT&T Armstrong Project. Version 1.5. Last accessed Jun. 16, 2010, 54 pages.
"Firmware Over the Air Updates—UE Flows and Screen Details". AT&T Armstrong Project. Version 1.9. Last accessed Jun. 16, 2010, 39 pages.
Paul McDougall. Browser. AT&T Armstrong Project. Version 1.3. Last accessed Jun. 16, 2010, 6 pages.
Paul McDougall. Maps. AT&T Armstrong Project. Version 1.3. Last accessed Jun. 16, 2010, 8 pages.
"Reference Guide". AT&T Armstrong Project. Version 1.0, Last accessed Jun. 16, 2010, 4 pages.
D. Austin Henderson, Jr. Rooms: the use of multiple virtual workspaces to reduce space contention in a window-based graphical user interface. ACM Transactions on Graphics. http://portal.acm.org/citation.cfm?id=24056&coll=portal&dl=ACM&CFID=23778768&CFTOKEN=77139655.
http://www.siliconvalleywatcher.com/mt/archives/2010/04/panama_kill_voi.php.
http://www.google.com/support/forum/p/voice/thread?tid=64d1c9d5fb45cccf&hl=en.
http://www.nytimes.com/2010/10/21/technology/personaltech/21smart.html?_r=1.
OA dated Aug. 1, 2012 for U.S. Appl. No. 12/903,632, 47 pages.
OA dated Sep. 7, 2012 for U.S. Appl. 12/902,979, 63 pages.
OA dated Jun. 12, 2012 for U.S. Appl. No. 12/903,618, 41 pages.
"Brads Live: AddressBooker & exporting my Facebook Phonebook" http://brad.livejournalcom/2398409.html as archived on archive.org on Dec. 5, 2008.
OA dated Feb. 11, 2013 for U.S. Appl. 12/902,979, 53 pages.
OA dated Jan. 30, 2013 for U.S. Appl. No. 12/903,632, 28 pages.
OA dated Dec. 20, 2012 for U.S. Appl. No. 12/903,679, 40 pages.
OA dated Jun. 13, 2013 for U.S. Appl. No. 12/903,382, 53 pages.
OA dated May 14, 2013 for U.S. Appl. No. 12/903,414, 62 pages.
Office Action dated Jan. 31, 2014 for U.S. Appl. No. 12/903,679, 17 Pages.
Notice of Allowance dated Jun. 27, 2014 for U.S. Appl. No. 12/903,679, 29 pages.
Non-Final OA dated Jun. 18, 2014 for U.S. Appl. No. 12/643,726.
Office action dated Aug. 26, 2014 for U.S. Appl. No. 12/903,618, 25 pages.
Office Action dated Sep. 23, 2014 for U.S. Appl. No. 12/903,382, 32 pages.
Sprint, "Palm Pre Phone User Guide," 2009, 388 Pages, Palm, Inc., United States.
Office Action dated Jan. 28, 2015 for U.S. Appl. No. 12/903,382, 57 Pages.
Office Action dated Mar. 10, 2015 for U.S. Appl. No. 12/903,618, 24 Pages.
Non-Final Office Action dated Dec. 2, 2015 for U.S. Appl. No. 12/903,632, 72 pages.
Office Action dated Jul. 29, 2015 for U.S. Appl. No. 12/903,618, 24 Pages.
Gross, et al., "Information Revelation and Privacy in Online Social Networks," Workshop on Privacy in the Electronic Society, Nov. 2005, pp. 71-80, ACM, Alexandria, Virginia, 10 Pages.
Office Action dated Oct. 11, 2013 for U.S. Appl. 12/903,679, 22 pages.
Office Action dated Nov. 1, 2013 for U.S. Appl. 12/903,382, 30 pages.
Office Action dated Sep. 26, 2013 for U.S. Appl. 12/903,618, 36 pages.

* cited by examiner

SYSTEMS, APPARATUS, METHODS AND COMPUTER-READABLE STORAGE MEDIA FOR FACILITATING INTEGRATED MESSAGING, CONTACTS AND SOCIAL MEDIA FOR A SELECTED ENTITY

CROSS-REFERENCES TO RELATED APPLICATIONS

This application claims the benefit of U.S. Provisional Application No. 61/251,717, filed Oct. 14, 2009, and titled "SYSTEMS, METHODS AND APPARATUS FOR NEXT-GENERATION MOBILE MESSAGING," which is hereby incorporated herein by reference in its entirety.

BACKGROUND

With advancements in technology, the amount and different types of information that users can access over wireless networks is growing rapidly. Similarly, mobile devices are becoming ubiquitous due to convenience of use resultant from their lightweight nature. Users are also pushing the envelope on the applications and information that are required to be provided via the devices. Applications related to messaging, contacts, social media, calendaring, digital imaging, audio recording, and the like, can be provided in leading devices. However, an ever present challenge for users is managing the immense types and amount of data to enable convenient and efficient use of the devices. Convention devices provide applications to the user as independent and isolated entities. These devices are application-targeted as the user is required to open a particular application to obtain information provided by the application. In order to enjoy different types of information about those with which the user is in communication, the user is required to repeat the process and open other applications to obtain other types of information provided by the other applications. The process of opening and entering different applications to gain different types of information about individuals and/or groups can be time-consuming and inefficient. Accordingly, systems, apparatus, methods and computer-readable storage media for facilitating integrated messaging, contacts and social media for a selected entity are desirable.

SUMMARY

The following presents a simplified summary in order to provide a basic understanding of various aspects described herein. The summary is not an extensive overview, and is not intended to identify key or critical elements or to delineate the scopes thereof. The sole purpose of the summary is to present selected concepts in a simplified form as a prelude to the more detailed description that is presented below.

The aspects described herein are systems, apparatus, methods and computer-readable storage media for facilitating integrated messaging, contacts and social media for a selected entity.

In one aspect, a computer-implemented method is provided. The computer-implemented method can include executing, using at least one processor, computer-readable instructions for performing various acts. The acts can include executing at least two applications. At least one of the two applications can be adapted to provide social media information. The acts can also include receiving a signal in response to a detected input gesture indicative of a selection of an entity. The selection can be performed via another one of the two applications. The acts can also include integrating the two applications such that social media information is generated about the entity. The integration can be in response to receiving the signal, and the social media information can include information from one or more social networking websites. The acts can also include displaying the social media information about the entity.

In another aspect, an apparatus is provided. The apparatus can include a processor and an application integration component. The application integration component can be configured to receive a signal in response to a detected input gesture indicative of a selection of an entity. The selection can be performed via at least one application in which the entity can be selected. The application integration component can also be configured to, in response to receiving the signal, integrate the application in which the entity can be selected with at least one application from which social media information can be provided, such that social media information about the entity is generated. The social media information can include information from one or more social networking websites. The apparatus can also include a user interface configured to display the social media information generated about the entity; and a computer-readable storage medium storing computer-executable instructions that, if executed, cause the processor to perform one or more functions of the user interface.

In another aspect, a computer-readable storage medium is provided. The computer-readable storage medium can store computer-executable instructions that, if executed on a processor, cause the processor to display, in a user interface, social media information about an entity. Social media information can be provided via at least one of two applications. Displaying the social media information about the entity can be in response to an application integration component: receiving a signal indicative of a selection of the entity from another one of the two applications; and integrating the two applications such that the social media information about the entity is generated. Integrating the two applications can be performed in response to receiving the signal indicative of the selection of the entity. The social media information can include information from one or more social networking websites.

BRIEF DESCRIPTION OF THE DRAWINGS

Non-limiting and non-exhaustive embodiments of various aspects detailed herein are described with reference to the following figures, wherein like reference numerals refer to like parts.

DETAILED DESCRIPTION

Figure 1:
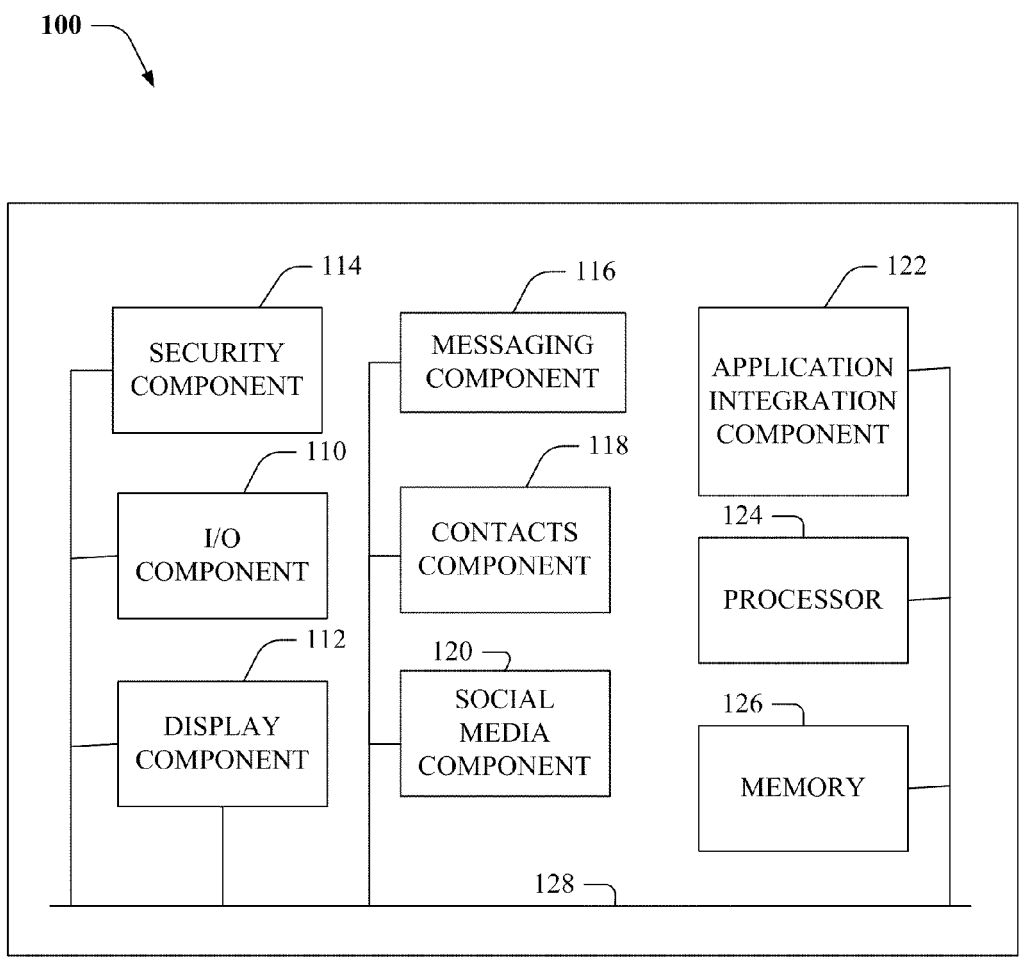
FIG. 1 illustrates a block diagram of an exemplary apparatus that facilitates integrated messaging, contacts and social media for a selected entity in accordance with aspects described herein.

Certain illustrative embodiments are described herein in the following description and the annexed drawings. These embodiments are merely exemplary, non-limiting and non-exhaustive. As such, all modifications, alterations, and variations within the spirit of the embodiments is envisaged and intended to be covered herein.

Further, in the following description, for purposes of mere explanation, numerous, specific details are set forth in order to facilitate a more thorough understanding of the embodiments described herein, including the claimed subject matter. However, as is known to those of ordinary skill in the art, the embodiments can be practiced, in many instances, without inclusion of the specific details.

As used in this application, the terms "component," "module," "system," "interface," and the like, are generally intended to refer to hardware and/or software or software in execution. For example, a component may be, but is not limited to being, a process running on a processor, a processor, an object, an executable, a thread of execution, a program and/or a computer. By way of illustration, both an application running on a controller and the controller can be a component. One or more components may reside within a process and/or thread of execution and a component may be localized on one computer and/or distributed between two or more computers. As another example, an interface can include input/output (I/O) components as well as associated processor, application and/or API components, and can be as simple as a command line or as complex as an Integrated Development Environment (IDE).

Furthermore, the embodiments may be implemented as a method, apparatus or article of manufacture using standard programming and/or engineering techniques to produce software, firmware, hardware, or any combination thereof to control a computer, apparatus or article of manufacture to implement the functionality disclosed herein. The term "article of manufacture," as used herein, is intended to encompass a computer program, or computer program product, accessible from any computer-readable device, computer-readable carrier, computer-readable media or computer-readable storage media. Computer-readable storage media can include, but are not limited to, magnetic storage devices (e.g., hard disk, floppy disk, magnetic strip), optical disks (e.g., compact disk (CD), digital versatile disk (DVD)), smart cards, and/or flash memory devices (e.g., card, stick, key drive). Additionally it should be appreciated that a carrier wave can carry computer-readable electronic data (e.g., the data transmitted and received via email and/or to access the Internet or a network such as a local area network (LAN)). As known to those of ordinary skill in the art, modifications can be made to the above embodiments without departing from the spirit of the disclosure.

Moreover, the word "exemplary" is used herein to mean an example, instance or illustration. Any aspect or design described herein as "exemplary" is not to be construed as preferred or advantageous over other aspects or designs. Rather, use of the word "exemplary" is merely intended to present examples of embodiments. Further, as used herein, the term "or" is intended to mean an inclusive "or" rather than an exclusive "or". That is, unless specified otherwise, or clear from context, "X employs A or B" is intended to mean any of the inclusive permutations (e.g., X employs A, X employs B, X employs A and B). In addition, the articles "a" and "an," as used herein, should be construed to mean "one or more" unless, as specified otherwise, or clear from context, the articles are directed to only a singular form.

As used herein, the terms "infer" or "inference" refer generally to the process of reasoning about or inferring states of the system, apparatus, method, environment, and/or user from a set of observations as captured via events and/or data. By way of examples, but not limitation, inference can be employed to identify a specific context or action, or can generate a probability distribution over states. The inference can be probabilistic (e.g., the computation of a probability distribution over states of interest based on a consideration of data and events). Inference can also refer to techniques employed for composing higher-level events from a set of events and/or data. Such inference can result in the construction of new events or actions from a set of observed events and/or stored event data, whether or not the events are correlated in close temporal proximity, and whether the events and data come from one or several event and data sources.

It will be appreciated by one of skill in the art that a communication network for systems described herein can include any suitable mobile- and/or wireline-based circuit-switched communication network including a global systems for mobile communication (GSM) network, a time division multiple access (TDMA) network, a code division multiple access (CDMA) network, such as IS-95 and subsequent iterations of CDMA technology, an integrated digital enhanced network (iDEN) network and a public switched telephone network (PSTN). Further examples of a communication network can include any suitable data packet-switched or combination data packet/circuit-switched communication network, wired or wireless internet protocol (IP) network such as a voice over internet protocol (VoIP) network, an IP data network, a universal mobile telecommunication system (UMTS) network, a general packet radio service (GPRS) network, or other communication networks that provide streaming data communication over IP and/or integrated voice and data communication over combination data packet/circuit-switched technologies.

Similarly, one of ordinary skill in the art will appreciate that a communication device for systems disclosed herein can include a mobile device, mobile phone, a PSTN phone, a cellular communication device, a cellular phone, a satellite communication device, a satellite phone, a VoIP phone, a wireless fidelity (WiFi) phone, a dual-mode cellular/WiFi phone, a combination cellular/VoIP/WiFi/Worldwide Interoperability for Microwave Access (WiMAX) phone or any suitable combination thereof. Specific examples of a mobile device can include, but is not limited to, a cellular device, such as a GSM, TDMA, CDMA, IS-95 and/or iDEN phone, a cellular/WiFi device, such as a dual-mode GSM, TDMA, IS-95 and/or iDEN/VoIP phones, UMTS phones UMTS VoIP phones, or like devices or combinations thereof. To provide support for a mobile device, a gateway routing component can include any suitable component that can perform centralized routing within a mobile, satellite, or similar network (but optionally need not include components that route strictly within a PSTN network), routing between communication networks, between networks of varying architecture (e.g., between PSTN, GSM, Universal Mobile Telecommunications System (UMTS), Enterprise VoIP, the Internet, or combinations thereof), and the like. Specific examples of a gateway routing component can include, but are not limited to, a gateway mobile switching center (GMSC), a gateway general packet radio service (GPRS) support node (GGSN), a session border control (SBC) device, or like devices. Additionally, a data storage component of such a system can include any suitable device, process and/or combination device and process that can store digital and/or switched information (e.g., server, database, data store, or the like).

FIG. 1 illustrates a block diagram of an exemplary apparatus that facilitates integrated messaging, contacts and social media for a selected entity in accordance with aspects described herein. The apparatus 100 can include an input/output (I/O) component 110, a display component 112, a security component 114, a messaging component 116, a contacts component 118, a social media component 120, an application integration component (AIC) 122, a processor 124, a memory 126 and a bus 128 communicatively coupling the aforementioned components and/or mechanisms one another.

The I/O component 110 can be configured to receive inputs from a region external to the apparatus 100 and to output information from the apparatus 100. In various embodiments, the inputs can be received in response to input gestures that are finger-based and/or stylus-based. In various embodiments, the outputs can be textual-, graphical-, pictorial-, video- and/or audio-based.

The display component 112 can be, include or be communicatively coupled to a UI (not shown). The UI can be configured to provide textual, graphical, video, pictorial and/or audio displays to the user of the apparatus 100. In some embodiments, the UI can be a triptych UI, and can be as described below with reference to FIG. 2. As used herein, the term "triptych" can mean "having three display regions virtually coupled to one another."

The display component 112 can be configured to display a selected display region in response to the input gesture. For example, upon displaying the middle display region of the triptych UI and receiving a swipe right gesture, the leftmost display region of the triptych can be displayed. Any number of different types of gestures (e.g., flicks, taps or the like) can be received for displaying a selected display region of the triptych UI. In the embodiments described herein, a triptych UI is generally discussed in connection with displaying information from or related to messaging, contacts and social media applications. However, by way of example, but not limitation, the applications could be email, alarm, camera, telephone, maps, browsers, music, photos, videos, clocks, settings, calendars and/or any other application typically found in a mobile device. Further, the spirit of the embodiments described also applies to a diptych user interface or n-tych user interfaces generally. As used herein, the term "diptych" shall mean "having two display regions virtually coupled to one another." In some embodiments, the display component 112 can be or include a UI that is a touch-sensitive touch screen.

The apparatus 100 can also include the security component 114. The security component can be a component configured to lock and unlock the UI and/or apparatus 100. In some embodiments, the security component 114 can unlock the UI and/or apparatus 100 in response to a swipe gesture received at the UI.

The apparatus 100 can also include a messaging component 116 configured to control the operation of one or more messaging applications. By way of example, but not limitation, messaging applications can include text-based, voice-based, video-based and/or combination voice and audio-based applications such as text messaging, instant messaging, internet and landline telephony, and/or audio and textual voicemail communications. By way of other examples, but without limitation, messaging applications can include applications utilizing short message service (SMS), multimedia messaging service (MMS), instant messaging (IM) protocols and/or text over internet protocol (ToIP) messaging.

The messaging component 116 can be configured to receive inputs from the I/O component 110 and format, transmit and/or receive messaging content in response to the inputs received. The messaging content can include a threaded list of one or more messages received at or transmitted from the apparatus 100. The messages can be text messages, instant messages, email messages, voicemail messages or any other messages that can be provided to the user. The content of the messages can be provided in bubbles or other shapes or indicia and, in some embodiments, can be associated with or displayed with an identifier of the initiator of the messaging content. In some embodiments, the messaging component 116 can display messaging content as the messaging card discussed below with reference to FIG. 3.

In some embodiments, the messaging component 116 can include a quick reply component (not shown) configured to provide a message notification to a user of the apparatus upon receipt of a message. The message notification can be displayed in a manner that superimposes the notification, and/or a text box for responding to the notification, over the content displayed on the UI of the apparatus 100. In various embodiments, the user can enter content for replying to the message notification and/or enter an input causing the message notification to be removed from the UI. Should the user desire to enter content to reply to the message notification, the content can be entered into a displayed text box associated with the message notification. Should the user desire to forego entering content to reply to the message notification, the message prompting the message notification can be closed and the message can nonetheless be provided in a message list generated by the messaging component 116.

The apparatus 100 can also include a contacts component 118 configured to control the operation of one or more contact applications. The contact applications can provide contacts-related information. By way of example, but not limitation, contacts-related information can include voice, email and/or geographical contact information for an individual or group in a contacts repository accessible by the apparatus 100. As such, the contacts-related information can be mobile, home, work and/or fax numbers, email addresses, physical street addresses, social network identification information, a social network identification, or the like. The contacts-related information can also include information about the individual or the group including, but not limited to, biographical information such as the birthday or date of incorporation of the individual and group, respectively, favorite foods of an individual and/or other information specific to the individual or group that the user of the apparatus 100 may want to access. The contacts-related information can include information that the user has stored locally on the apparatus 100 (e.g., in the address book of the apparatus 100) and/or that the user can access from a location that is remote from the physical location of the apparatus 100.

In various embodiments as described herein and with reference to any number of different applications including, but not limited to, a messaging application, a contacts application and/or a social media application, where an entity, person or individual is discussed, the entity, person or individual can be a legal or natural entity, person or individual. Similarly, in various embodiments as described herein and with reference to any number of different applications including, but not limited to, a messaging application, a contacts application and/or a social media application, where an entity or group is discussed herein, the entity or group can include one or more legal or natural entities, persons or individuals. By way of example, but not limitation, an entity or group could be an organization, a business entity, a group of humans, and/or a group including a legal and a natural person or entity.

The apparatus 100 can also include a social media component 120 configured to control the receipt, aggregation, generation, output and/or filtering of social media information at the apparatus 100. By way of example, but not limitation, social media information can include, but is not limited to, information associated with or output from social media feeds, blog information, chat information, instant messaging information, and the like. The social media information can be displayed in any number of arrangements including, but not limited to, the subject matter of the social media feed, the social networking site from which the social media feed is provided and/or the chronological order of the social media feeds. In some embodiments, the social media information can include comments posted (or a number of comments posted) in association with one or more social media feeds for the individual. In some embodiments, one or more comments can be shown on the UI with the one or more feeds. The social media applications can include applications that provide social media feeds, news feeds and wall postings from FACEBOOK®, activity updates (e.g., tweets) from TWITTER® or other information from social networking sites such as MYSPACE®, websites of interest and the like.

The apparatus 100 can also include an application integration component (AIC) 122. In some embodiments, the AIC 122 can include software and/or hardware configured to integrate one or more applications at an individual level or at a group level. Integrating one or more applications at an individual level can include retrieving and/or providing information specific to an individual. Integrating one or more applications at a group-level can include retrieving and/or providing information specific to a group or individuals of, or members of, the group. For example, the AIC 122 can provide messaging, contacts and/or social media information about a specific individual or for a specific group or for specific members of a group.

In these embodiments, the AIC 122 can enable the apparatus 100 to be individual-targeted or group-targeted in provisioning of contact, messaging and/or social media information without requiring a user of the apparatus to enter individual applications for each of the contact, messaging and/or social media information.

As such, while the messaging component 116, contacts component 118 and the social media component 120 can allow the user of the apparatus 100 to view messaging, contacts and social media information about one or more individuals or groups on a single display region of the UI, when the AIC 122 integrates the messaging, contacts and/or social media application, the AIC 122 can do such integration at an individual or group level. As such, upon integration, the messaging, contacts and/or social media information can be targeted towards a single individual and/or a single group. The targeted information can be information that displays details specific to or about the individual and/or group. Such targeted information can be displayed by UI.

The apparatus 100 can also include a processor 124 for performing various operations described herein, and a memory 126 for storing computer-executable instructions and/or information for performing the operations described herein.

Referring again to FIG. 1, in some embodiments, the apparatus 100 can include a processor 124, a first application component (e.g., 120), a second application component (e.g., 118 or 116), an AIC 122, a UI (not shown) of the display component 112 and a computer-readable storage medium (e.g., 126). The processor 124, first application component, second application component, AIC 122, UI, and computer-readable storage medium can be communicatively coupled to one or more of the other components and/or mechanisms described above.

The first application component can be configured to execute a first application for providing social media information. The second application component can be configured to execute a second application for accessing information indicative of an entity.

In various embodiments, the entity can be an individual or a group. In some embodiments, the second application can be a messaging application such as that provided by messaging component 116. In these embodiments, the entity can be a group of individuals for which selectable indicia of a group and/or broadcast message is displayed on the UI.

The AIC 122 can be configured to receive a signal in response to a detected input gesture indicative of a selection of the entity from the second application. The AIC 122 can also be configured to, in response to receiving the signal, integrate the first application and the second application such that social media information about the entity is generated.

The social media information can include information from one or more social networking websites. In various embodiments, the social media information can be any type of social media information described herein, including, but not limited to, information from a blog, information from a news feed, information from a post at a social networking website.

In various embodiments, the social media information about the entity can differ in content and/or type from the information indicative of the entity. By way of example, but not limitation, the social media information can include wall postings, news feeds, blogs and/or any social media information related thereto, as described herein. By contrast, in some embodiments, the information indicative of the entity can include contact-related information such as a name or telephone number or email address of a contact. Accordingly, one or more of the embodiments described herein can include generating social media information that includes one or more textual, graphical, pictorial and/or video elements that differ from the textual, graphical, pictorial and/or video elements included in the information indicative of the entity.

In some embodiments, the information from the social networking websites includes first social media information about the entity from a first social networking website, and social media information about the entity from a second social networking website. The social media information about the entity displayed on the user interface can therefore be an aggregate of the first social media information about the entity and the second media information about the entity.

In some embodiments, the UI can be a touch screen. In other embodiments, the UI can be any interface configured to display social media information about an entity. The user interface can be configured to display the social media information about the entity.

In some embodiments, the UI can include a plurality of any number of display regions. For example, in some embodiments, the UI includes a plurality of display regions including a leftmost display region, a rightmost display region and a middle display region between the leftmost display region and the rightmost display region. The UI can be configured to display the leftmost display region, the rightmost display region and the middle display region as non-overlapping regions and/or in non-concurrent time intervals. In some embodiments, the UI and operation thereof can be as shown and described with reference to FIGS. 2 and 6.

In some embodiments, the UI can be configured to display the social media information about the entity on the leftmost display region, the rightmost display region or the middle display region. In some embodiments, the UI can be configured to display the information indicative of the entity on another one of the leftmost display region, the rightmost display region or the middle display region.

The UI can selectively display the leftmost display region, the rightmost display region or the middle display region in response to a selected input gesture. By way of example, but not limitation, the selected input gesture can be a swipe left gesture or a swipe right gesture.

The computer-readable storage medium can store computer-executable instructions that, if executed, cause the processor 124 to implement at least one of the first application component, the second application component, the AIC 122 or the UI.

Figure 2:
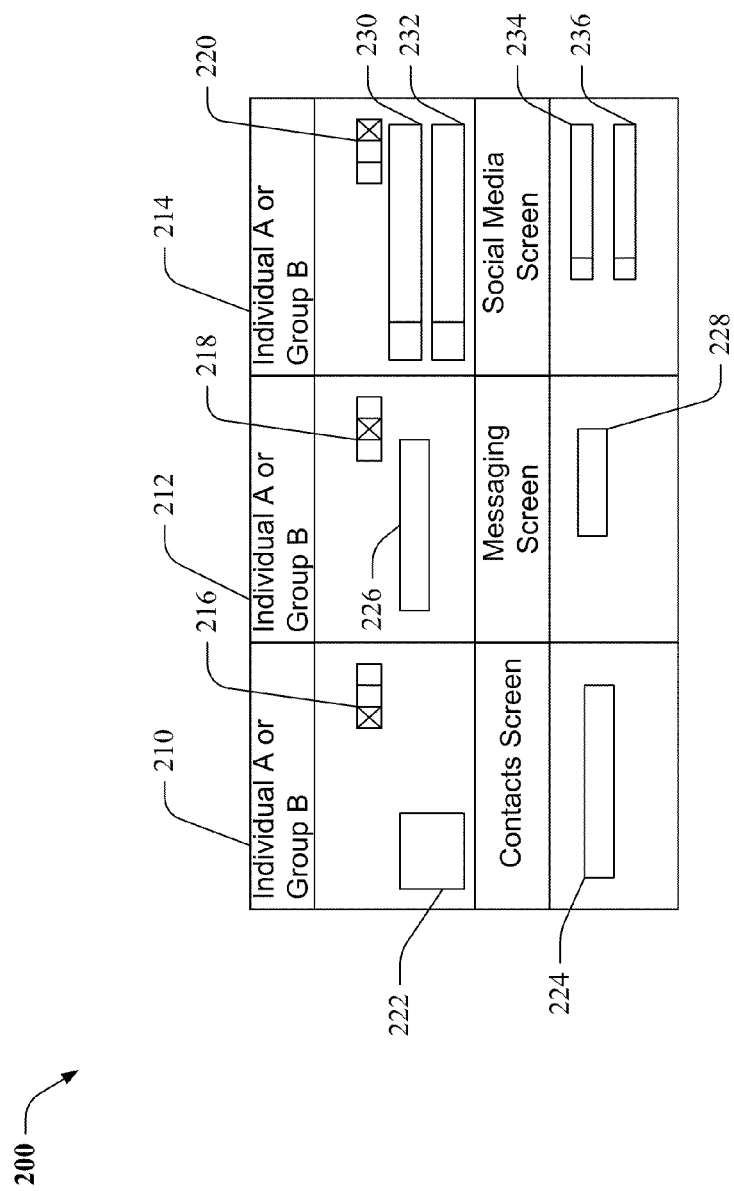
FIG. 2 illustrates a block diagram of an exemplary triptych user interface for facilitating integrated messaging, contacts and social media for a selected entity in accordance with aspects described herein.

FIG. 2 illustrates a block diagram of an exemplary triptych UI for facilitating integrated messaging, contacts and social media for a selected entity in accordance with aspects described herein. In the embodiment shown of the triptych UI 200, the leftmost display region 210 can be for displaying contacts information, the rightmost display region 214 can be for displaying social media information and the middle display region 212 can be for displaying messaging information. However, in other embodiments, any display region can display any information, as determined by the apparatus and/or UI designer. In other embodiments, any type of graphical, textual, pictorial and/or video information can be displayed on any display region, as determined by the apparatus and/or UI designer.

The middle display region 212 can include indicia 226, 228 of messaging content. The messaging content can be for a specific individual or group, as described with reference to the AIC 122 of FIG. 1. In some embodiments, the middle display region 212 is a messaging screen from which the individual or group is initially selected, at the time of selection of the individual or group. The messaging screen can display information for more than one individual and/or group.

The leftmost display region 210 can include indicia 222 of the individual or group for which contacts-related information is provided, and the contacts-related information 224.

The rightmost display region 214 can include social media information 230, 232, 234, 236 (e.g., social media feeds) from social networking sites. In the embodiment shown, the social media information can be displayed in an aggregated form whereby social media information 230, 232 from a first social networking site can be displayed concurrently on the UI with social media information 234, 236 from a second social networking site.

Figure 3:
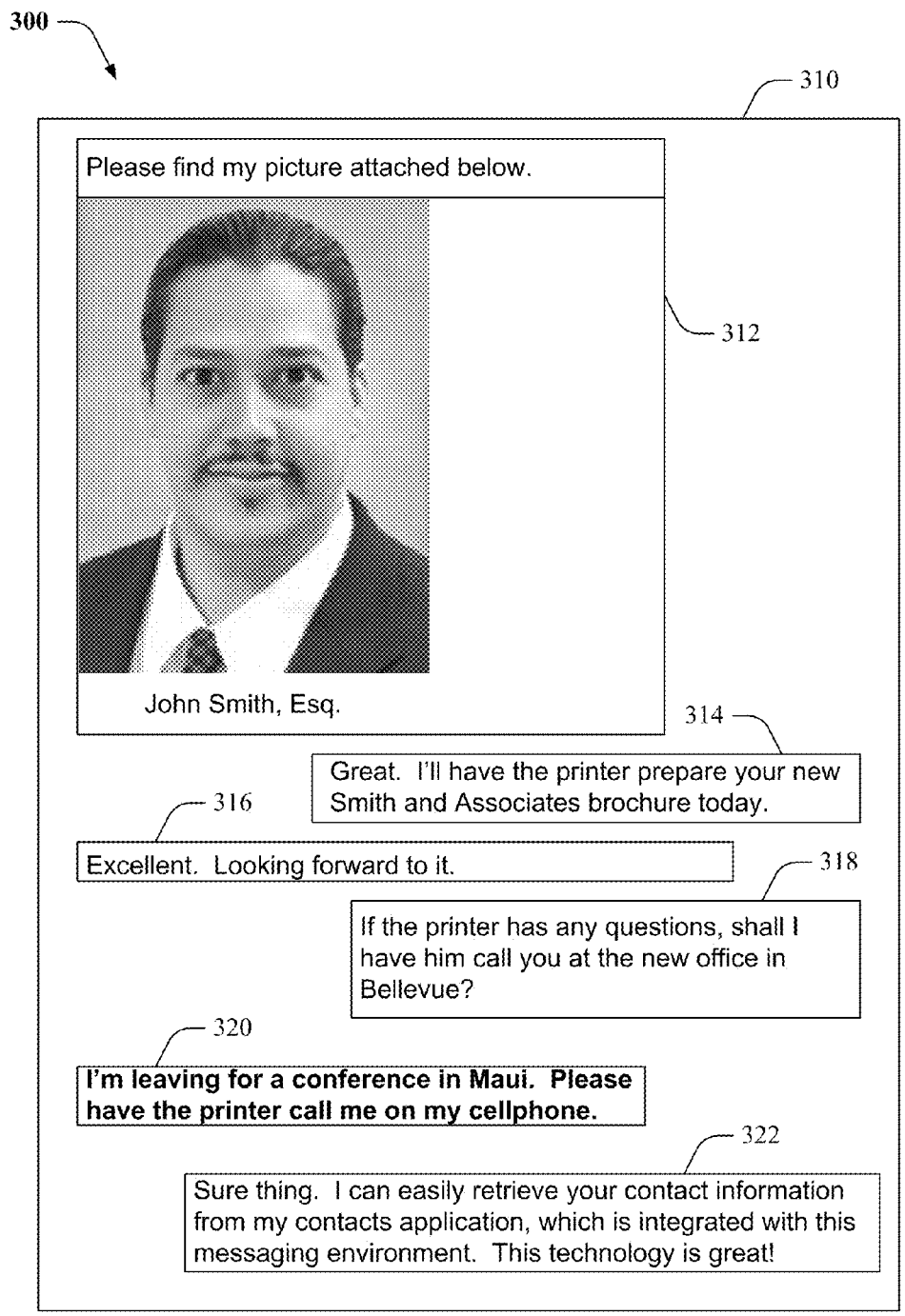
FIG. 3 illustrates a block diagram of a display region of a triptych user interface providing an exemplary messaging screen that facilitates integrated messaging, contacts and social media for a selected entity in accordance with aspects described herein.

FIG. 3 illustrates a block diagram of a display region of a triptych UI providing a messaging screen that facilitates integrated messaging, contacts and social media for a selected entity in accordance with aspects described herein. The messaging screen 300 can provide a display area 310. The display area 310 can include messaging content 312, 314, 316, 318, 320, 322 to or from one or more individuals or groups. The messaging content can be provided in bubbles or other visual indicia of the individual or groups that transmitted the messaging content 312, 314, 316, 318, 320, 322 or received the messaging content 312, 314, 316, 318, 320, 322. The messaging content 312, 314, 316, 318, 320, 322 can be organized in chronological order, by order of importance as stored in settings for the triptych UI and/or by the identity of the individual or group for which messaging information is provided.

As shown in the embodiment illustrated, the messaging content can be textual, graphical, video and/or pictorial. Additionally, the messaging content can include audio files and/or links to website or audio files. The individual (or group) with which a conversation is being (or has been) conducted can be selected for integration and individual-targeted information provisioning described with reference to FIG. 1. In the embodiment shown, the messaging content 320 can be selected thereby selecting the individual corresponding to the messaging content (e.g., J. Smith, Esq.). In other embodiments, individuals and/or groups can be selected by any number of ways of identifying an individual or group including, but not limited to, retrieving a name or other identifier of the individual or group in response to a search query, inputting the name or other identifier of the individual or group at the triptych UI, selecting the individual or group from a history log of past communications, selecting the individual or group from a contact application or a social media application, and/or selecting the individual and/or group from a list of individuals or groups in a selected social network.

Figure 4:
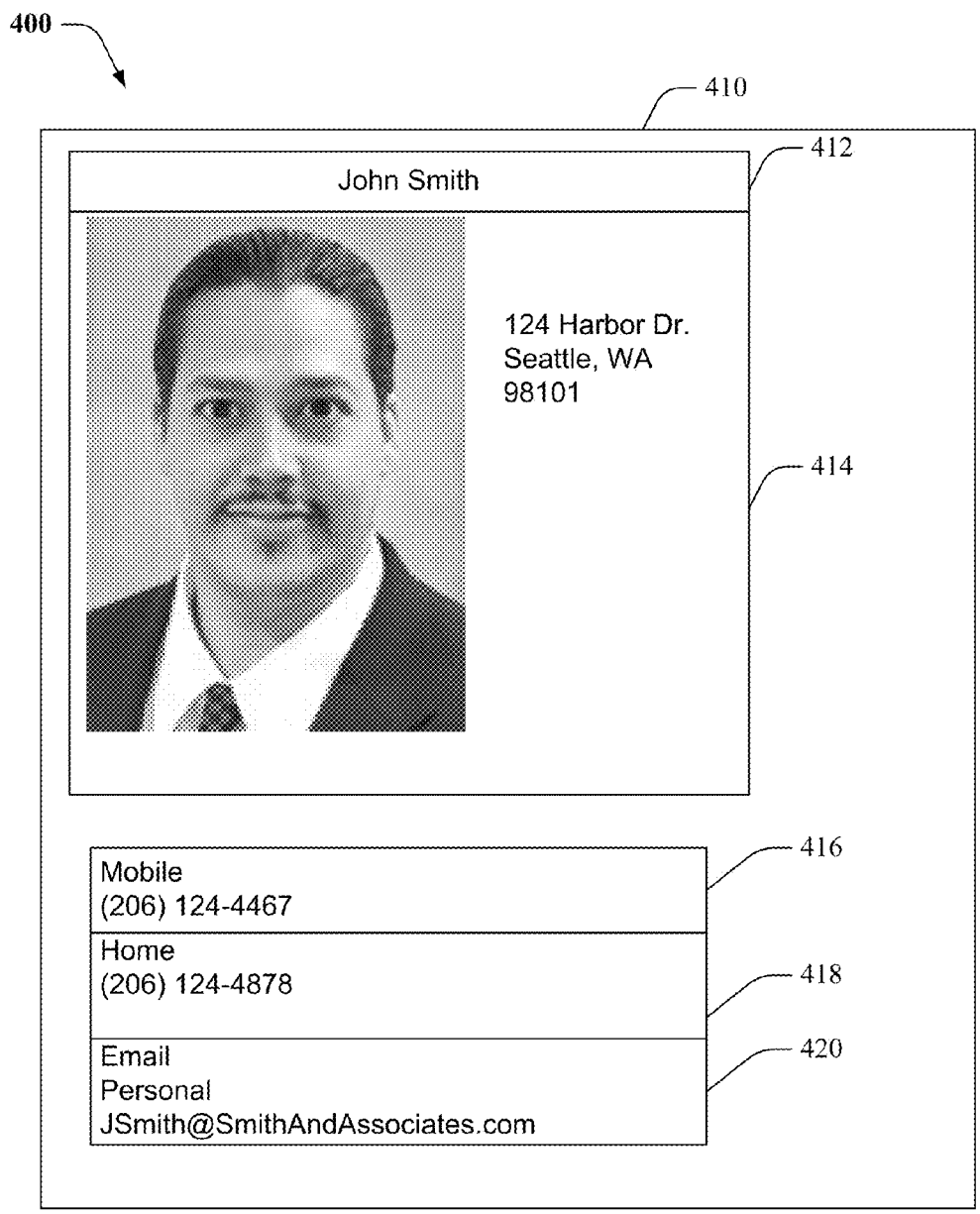
FIG. 4 illustrates a block diagram of a display region of a triptych user interface providing an exemplary contacts screen that facilitates integrated messaging, contacts and social media for a selected entity in accordance with aspects described herein.

FIG. 4 illustrates a block diagram of a display region of a triptych UI providing an exemplary contacts screen that facilitates integrated messaging, contacts and social media for a selected entity in accordance with aspects described herein. The contact screen 400 can include contacts-related information 410. By way of example, but not limitation, the contacts-related information 410 can include, a name 412, physical mailing address 414, contact telephone numbers including, but not limited to a mobile telephone number 416, a home telephone number 418, and/or an email address 420.

In some embodiments, the contacts-related information can include a social network identification (not shown) and/or social network identification information (not shown).

Figure 5A:
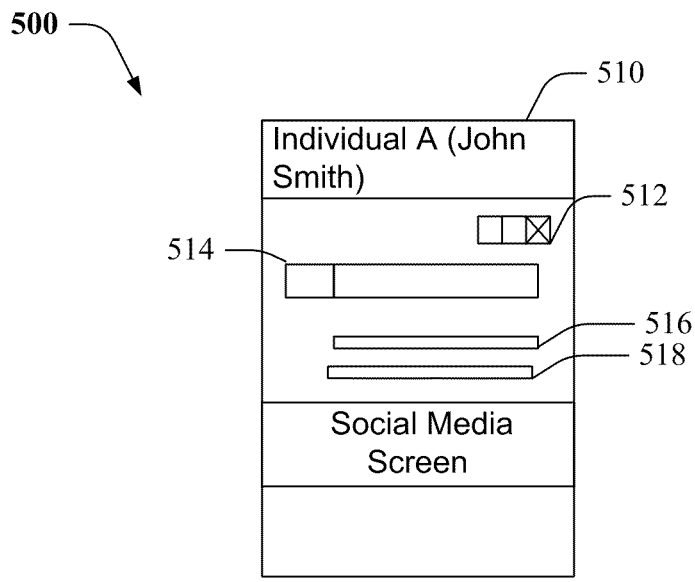
FIGS. 5A and 5B illustrate block diagrams of a display region of a triptych user interface providing exemplary social media screens that facilitate integrated messaging, contacts and social media for a selected entity in accordance with aspects described herein.
Figure 5B:
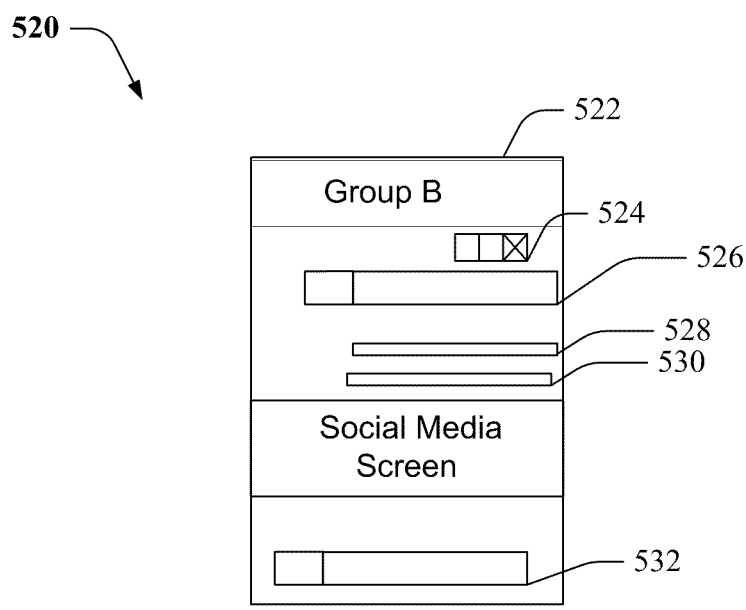

FIGS. 5A and 5B illustrate block diagrams of a display region of a triptych UI providing exemplary social media screens that facilitate integrated messaging, contacts and social media for a selected entity in accordance with aspects described herein. With reference to FIG. 5A, the social media screen 500 can display a social media environment that can include social media information about the individual selected. The social media information 514, 516, 518 can be one or more of graphical, textual, video and/or pictorial social media information. In various embodiments, the social media information 514, 516, 518 can be received from one or more social networking sites, and/or aggregated from two or more social networking sites. While FIG. 5A displays social media information about an individual selected, with reference to FIG. 5B, the social media screen 520 can include social media information about a group selected. The social media information 526, 528, 530, 532 can be one or more of graphical, textual, video and/or pictorial information. In some embodiments, the social media information 526, 528, 530, 532 can be received from one or more social networking sites, and/or aggregated from two or more social networking sites. The social media information can be about the group and/or about one or more members of the group.

Figure 6:
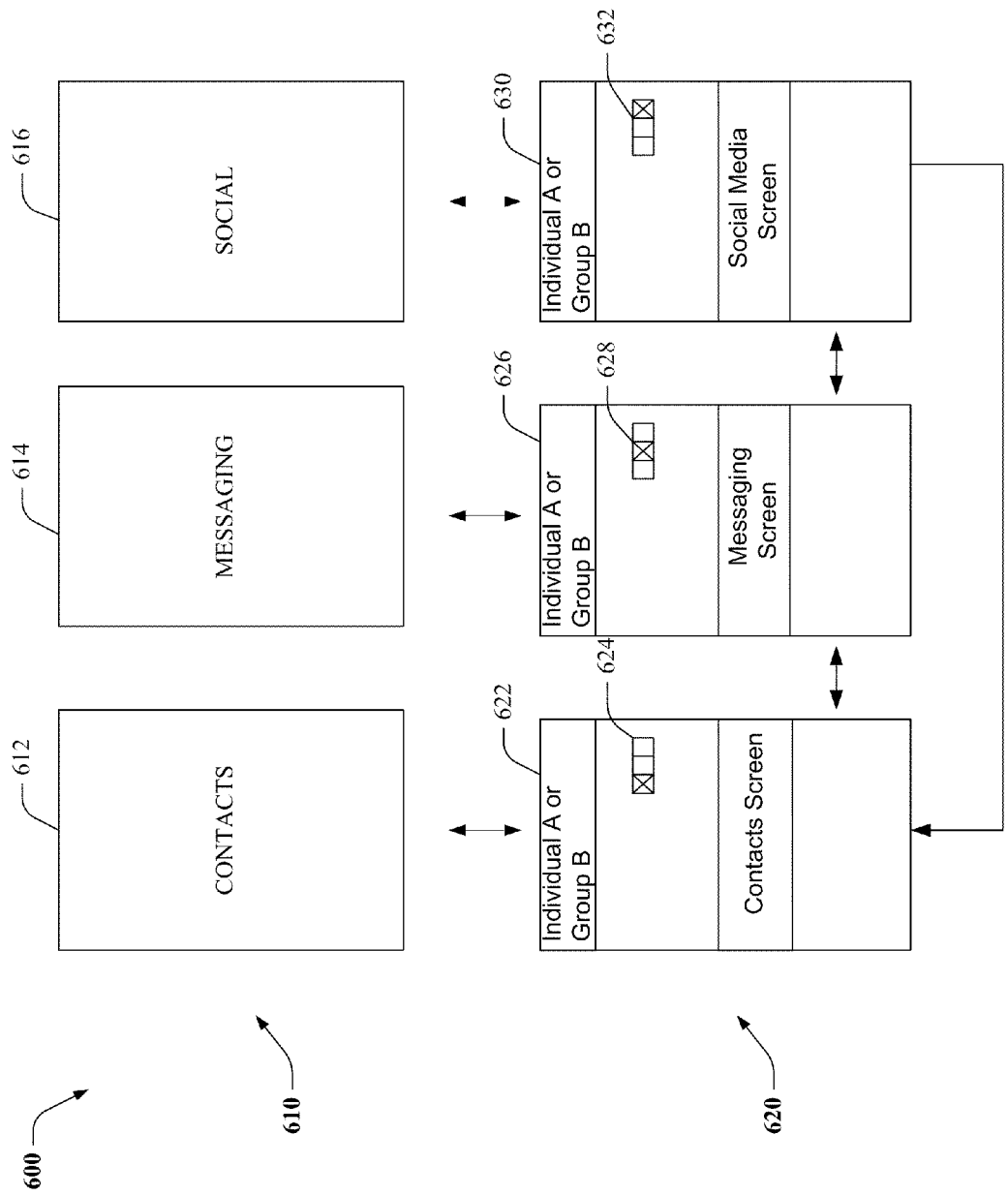
FIG. 6 illustrates a flow diagram showing an exemplary relationship between and within applications and a triptych user interface for facilitating integrated messaging, contacts and social media for a selected entity in accordance with aspects described herein.

FIG. 6 illustrates a flow diagram showing an exemplary relationship between and within applications and a triptych UI for facilitating integrated messaging, contacts and social media for a selected entity in accordance with aspects described herein. With reference to FIGS. 1, 2 and 6, inputs for opening a contact application 612, a messaging application 614 or a social media application 616 can be received at the apparatus 100 and/or the UI of the display component 112. The contacts application 612, messaging application 614 and social media application 616 can be level one applications 610 that operate independent of one another and that typically require a user to enter each of the applications independently to access application-related information about a user or a group. In the embodiments described herein, in response to the apparatus 100 and/or UI receiving an input selecting an individual (or group) while in a first application, the AIC 122 can provide a level two 620 integration operation. The level two 620 integration operation can include integrating one or more applications and generating or outputting individual-targeted (or group-targeted) contacts-related, messaging and/or social media information about the selected individual or group. By way of example, but not limitation, social media information about a selected individual can include information on a social networking webpage belonging to the individual.

In embodiments wherein the level two 620 operations are displayed via a triptych UI, the AIC 122 can integrate the level one applications 610 such that first 622, second 626 and third 630 display regions of the triptych UI can display the individual-targeted or the group-targeted contacts-related, messaging or social media information, respectively. In embodiments described herein, inputs for selecting the display of contacts-related, messaging or social media information on the triptych UI can be any number of different types of inputs. The inputs can include, but are not limited to, swipe right or swipe left gestures (or tap gestures on the triptych button 624, 628, 632). The inputs can display the next display region in succession in the order of triptych UI display regions. By way of example, but not limitation, a swipe left gesture from the middle display region, which corresponds to the messaging screen 626 in the illustrated embodiment, can cause the leftmost display region, which corresponds to the contacts screen 622 to be displayed. Similarly, a swipe right gesture from the middle display region can cause the rightmost display region, which corresponds to the social media screen 630 in the illustrated embodiment, to be displayed. Further, a swipe left gesture from the rightmost display region can cause the leftmost display region, which corresponds to the contacts screen 622 in this embodiment, to be displayed. A swipe right gesture from the rightmost display region can cause the messaging screen 626 to be displayed. In various embodiments, in lieu of swiping gestures, a tap gesture on the triptych button 624, 628, 632 can cause the next display region to the right of (or, in some embodiments, the left of) the currently-displayed display to be displayed.

Figure 7A:
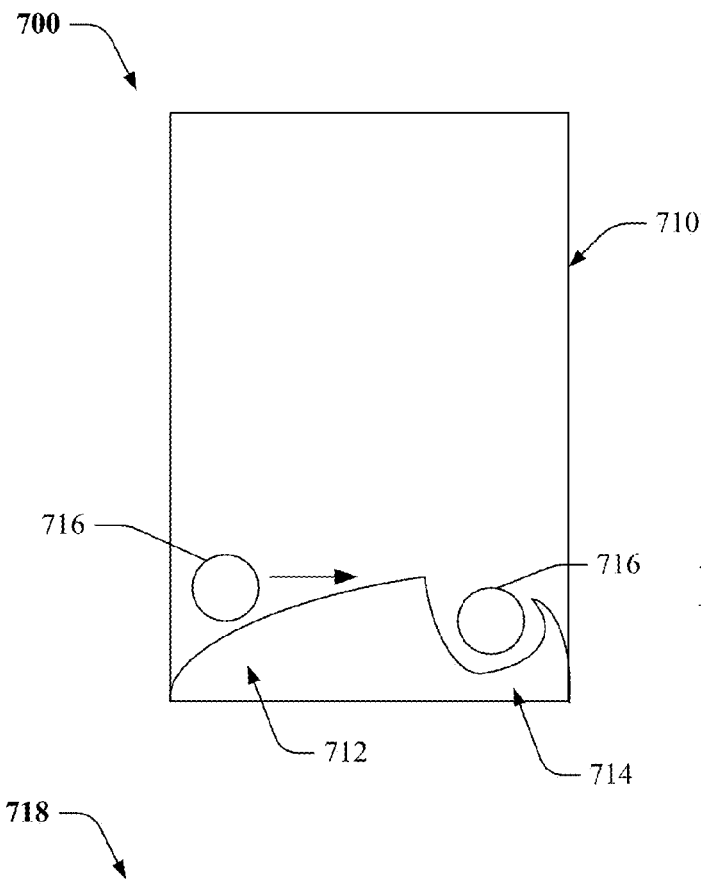
FIG. 7A illustrates a block diagram of a user interface that can have a locked state or an unlocked state in accordance with aspects described herein.

FIG. 7A illustrates a block diagram of a UI that can have a locked state or an unlocked state in accordance with aspects described herein. With reference to FIG. 1, in some embodiments, the UI can change state as controlled by the security component 114.

Referring back to FIG. 7A, while the apparatus is shown as apparatus 700, principles described herein can also apply to apparatus 100. The UI 710 includes, at least, a locked region 712 and an unlocked region 714. The locked region 712 corresponds to a locking portion while the unlocked region 714 corresponds to an unlocking portion. At a first time, icon 716 can reside in the locked region 712 and the apparatus 700 and/or UI 710 can therefore remain in a locked state. At a second time, the icon 716 can be moved to the unlocked region 714. The icon 716 can be moved from the locked region 712 to the unlocked region 714 via an input gesture on the surface of the UI 710. In various embodiments, the input gesture can include a swipe right gesture from the locked region 712 to the unlocked region 714, or a gesture tapping the UI 710 in the unlocked region 714 while the icon is in the locked region 712 of the UI 710. While the embodiments shown and described disclose a swipe right gesture for unlocking the apparatus 700, in other embodiments wherein the design of the locations of the locking and unlocking portions of the UI is suitable, the apparatus 700 and/or UI can be unlocked upon receiving a swipe left gesture and/or upon receiving a swipe up or a swipe down gesture.

Figure 7B:
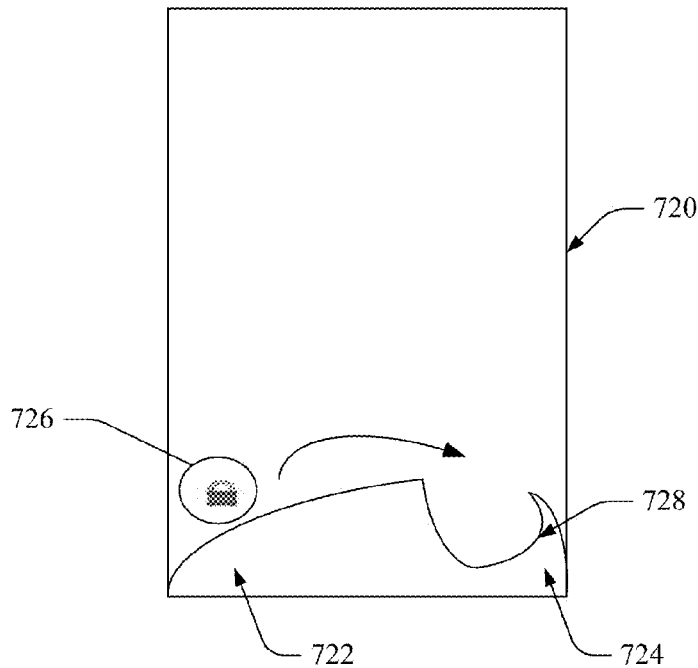
FIG. 7B illustrates a block diagram of a user interface that can have a locked state or an unlocked state in accordance with aspects described herein.

FIG. 7B illustrates a block diagram of another UI that can have a locked state or an unlocked state in accordance with aspects described herein. With reference to FIG. 1, in some embodiments, the UI can change state as controlled by the security component 114.

While the apparatus is shown as apparatus 718, principles described herein can also apply to apparatus 100. The UI 720 includes, at least, a locked region 722 and an unlocked region 724. The locked region 722 corresponds to a locking portion while the unlocked region 724 corresponds to an unlocking portion. A lock icon 726 can be displayed in the locked region 722 or the unlocked region 724. An arch 728 can be displayed in the unlocked region 724. At a first time, lock icon 726 can reside in the locked region 722 and the UI 720 can therefore remain in a locked state. At a second time, the lock icon 726 can be moved to the arch 728 of the unlocked region 724. When the lock icon 726 is moved to the arch 728 of the unlocked region 724, a new icon displaying an unlocked lock (not shown) can be displayed. In some embodiments, when the lock icon 726 is moved to the arch 728 of the unlocked region 724, the lock icon 726 continues to be displayed until the UI is unlocked and/or the UI provides a new display.

The lock icon 726 can be moved from the locked region 722 to the arch 728 of the unlocked region 724 via an input gesture on the surface of the UI 720. In various embodiments, the input gesture can include a swipe right gesture from the locked region 722 to the unlocked region 724. In various embodiments, the input gesture can include a swipe in the shape of an arc. The swipe can be provided from the locked region 722 to the unlocked region 724. While the embodiment shown and described discloses a swipe right gesture or a swipe in the form of an arc for unlocking the apparatus 718, in other embodiments wherein the design of the locations of the locking and unlocking portions of the UI is suitable, the apparatus 718 and/or UI can be unlocked upon receiving a swipe left gesture and/or upon receiving a swipe up, a swipe down gesture and/or a swipe along a diagonal.

Figure 8A:
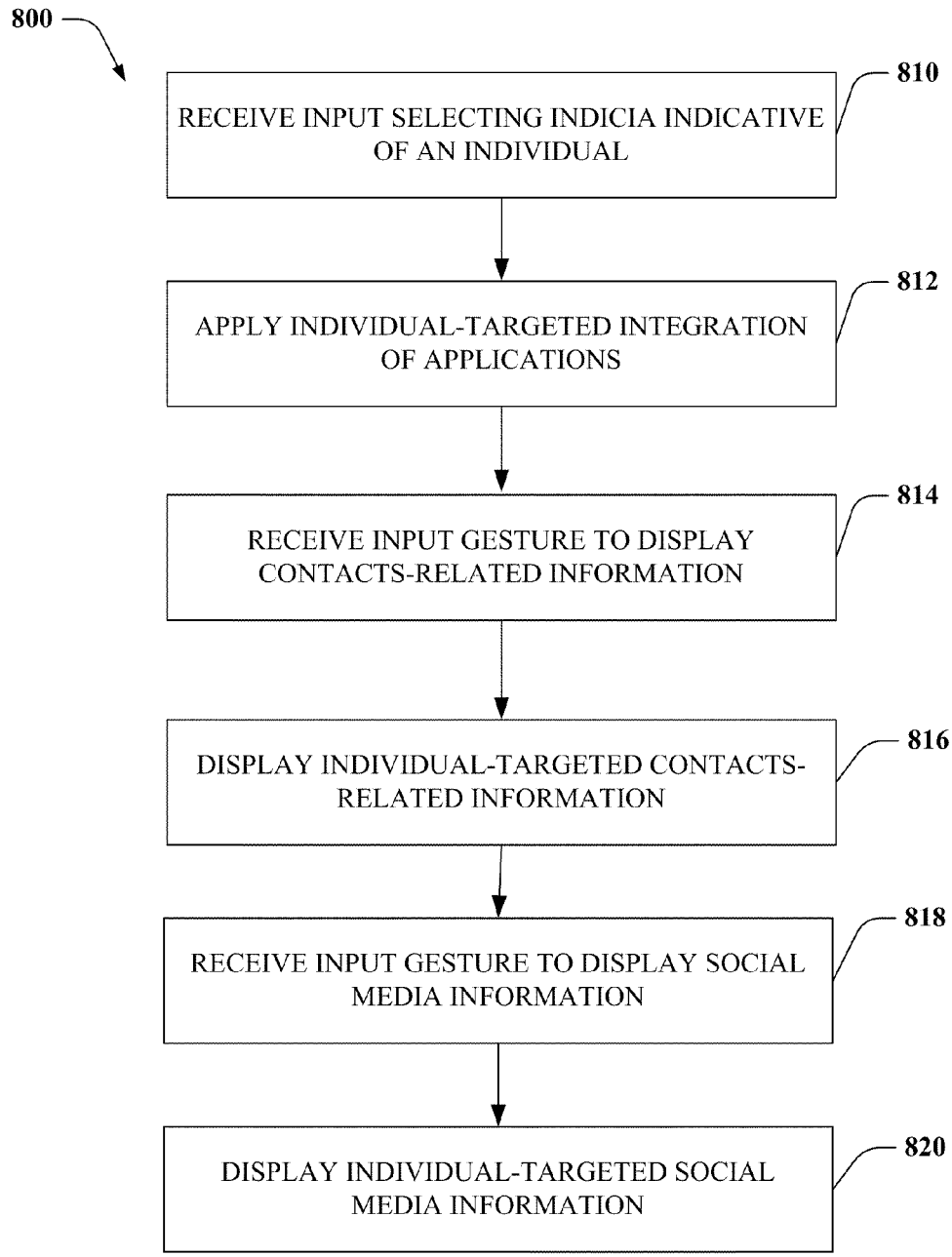
FIGS. 8A, 8B and 9 illustrate exemplary flowcharts of methods that facilitate integrated messaging, contacts and social media for a selected entity in accordance with aspects described herein.
Figure 8B:
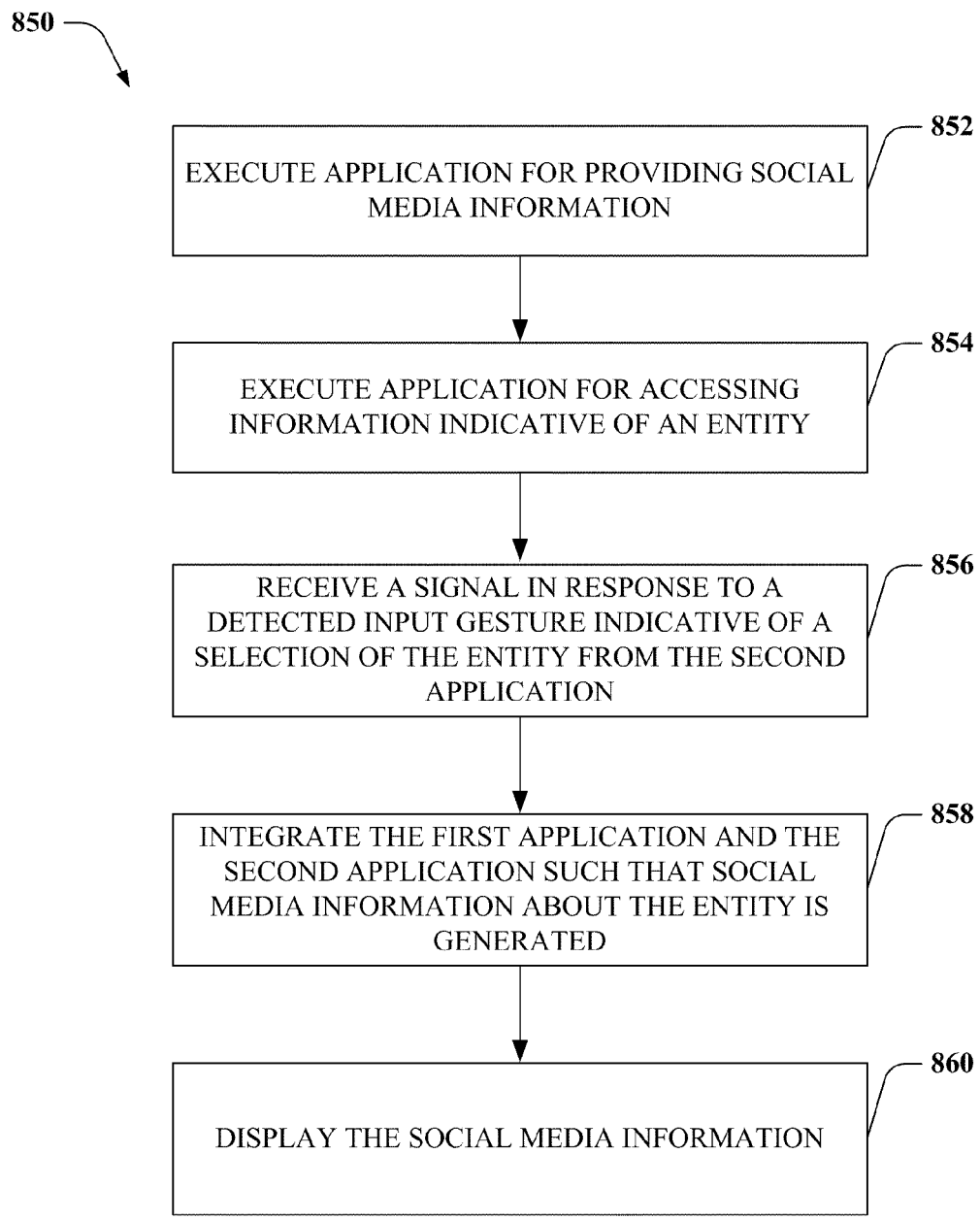
Figure 9:
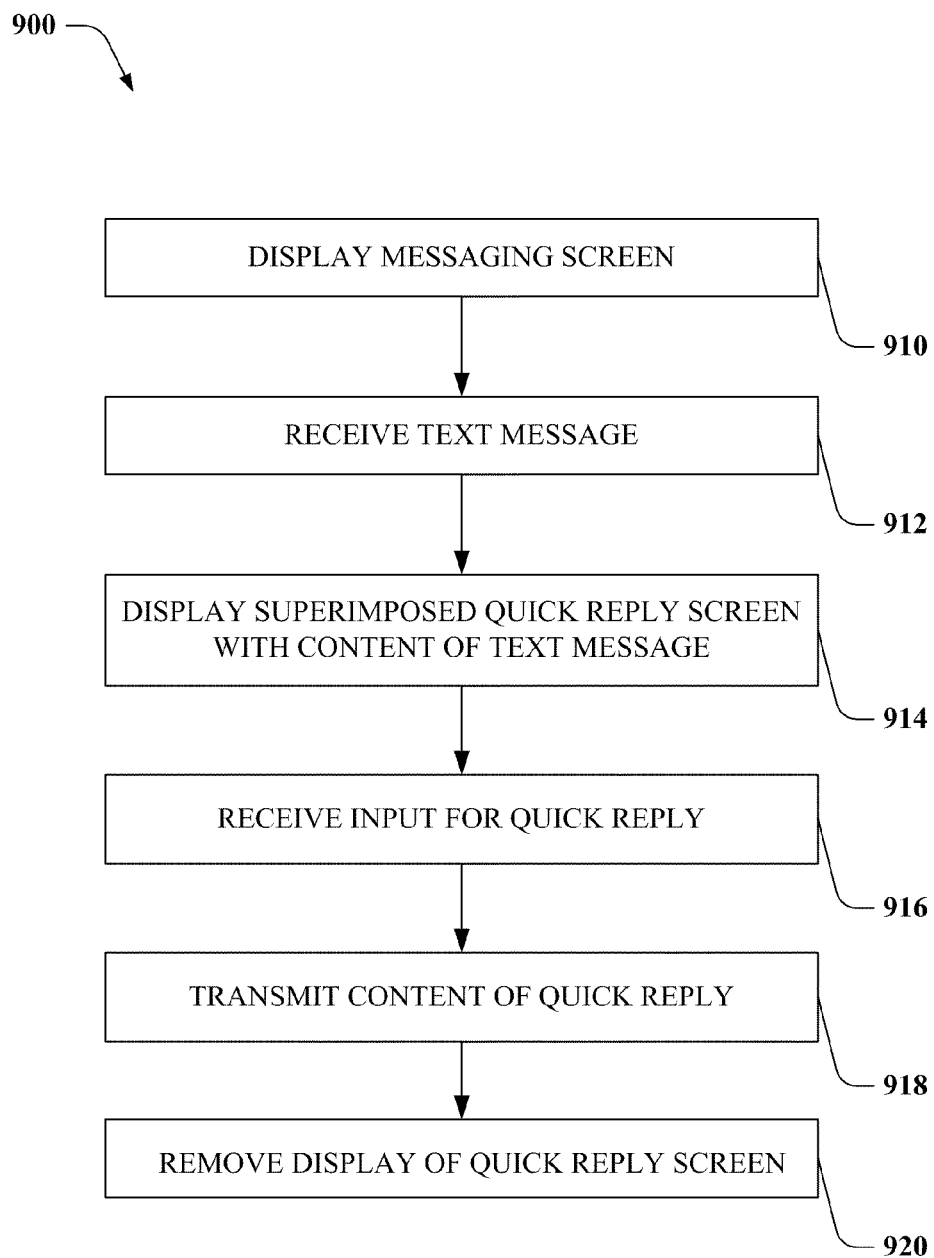

FIGS. 8A, 8B and 9 illustrate exemplary flowcharts of methods that facilitate integrated messaging, contacts and social media for a selected entity in accordance with aspects described herein. In various embodiments, the methods 800, 850, 900 can include executing computer-readable instructions stored on a computer-readable storage medium for performing various actions.

Referring to FIG. 8A, the method 800 can include the following actions. At 810, input selecting indicia indicative of an individual can be received. By way of example, but not limitation, the input selecting the indicia can be received in response to any number of different types of inputs including, but not limited to, depressing a portion of a touch screen UI. The portion of the UI can correspond to a location of a display of a message to or from an individual or group. In some embodiments, the input can be received in response to typing in an identifier of the individual or group. At 812, an individual-targeted integration of applications can be performed. In some embodiments, the functions described at 812 can be performed by the AIC 122 described with reference to FIG. 1. At 814, an input gesture can be received to display contacts-related information. At 816, individual-targeted contact-related information can be displayed.

At 818, an input gesture to display social media information can be provided. At 820, individual-targeted social media information can be displayed. In various embodiments, individual-targeted social media information can be social media information about the individual and/or group selected at 810.

Referring to FIG. 8B, at 852, the method 850 can include executing a first application for providing social media information. At 854, the method 850 can include executing a second application for accessing information indicative of an entity. The entity can be an individual and/or a group.

At 856, the method 850 can include receiving a signal in response to a detected input gesture. The detected input gesture can be indicative of a selection of the entity. The entity can be selected while the user is in the second application.

At 858, the method 850 can include, in response to receiving the signal, integrating the first application and the second application such that social media information about the entity is generated. In some embodiments, the social media information can include information from one or more social networking websites. At 860, the method 850 can include displaying the social media information about the entity.

In various embodiments, the social media information about the entity can differ in content and/or type from the information indicative of the entity. By way of example, but not limitation, the social media information about the entity can include wall postings, news feeds, and/or blogs about the entity, posted on a social networking webpage assigned to the entity and/or any other social media information, as described herein, and about the entity. By contrast, in some embodiments, the information indicative of the entity can include contacts-related information including such as a name or telephone number or email address of a contact. Accordingly, while the contacts-related information can be a first set of characters, the social media information can be a second set of characters. The first set of characters can be different from the second set of characters.

Referring to FIG. 9, the method 900 can include the following steps. At 910, the messaging screen can be displayed. At 912, a text message can be received. In some embodiments, other types of messages can be received, including, but not limited to, an email message and/or an instant message. At 914, a quick reply screen with content of a text message can be displayed superimposed over the messaging screen. At 916, input for providing a quick reply to the text message can be received. At 918, the content of the quick reply can be transmitted. At 920, the quick reply screen is removed. Accordingly, the messaging screen is again displayed without interruption by the quick reply screen.

Figure 10:
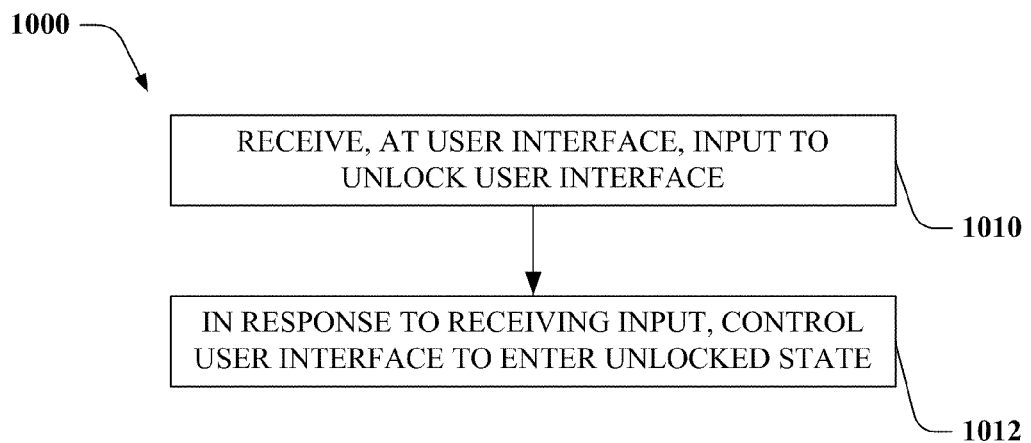
FIG. 10 illustrates an exemplary flowchart of a method of unlocking a user interface in accordance with aspects described herein.

FIG. 10 illustrates an exemplary flowchart of a method 1000 of unlocking an apparatus in accordance with aspects described herein. At step 1010, an input can be received at a UI, for unlocking the UI. At step 1012, in response to receiving the input, the UI can be controlled to enter an unlocked state. In various embodiments, the UI can be controlled to enter the unlocked state as described with references to FIG. 7A or FIG. 7B.

Figure 11:
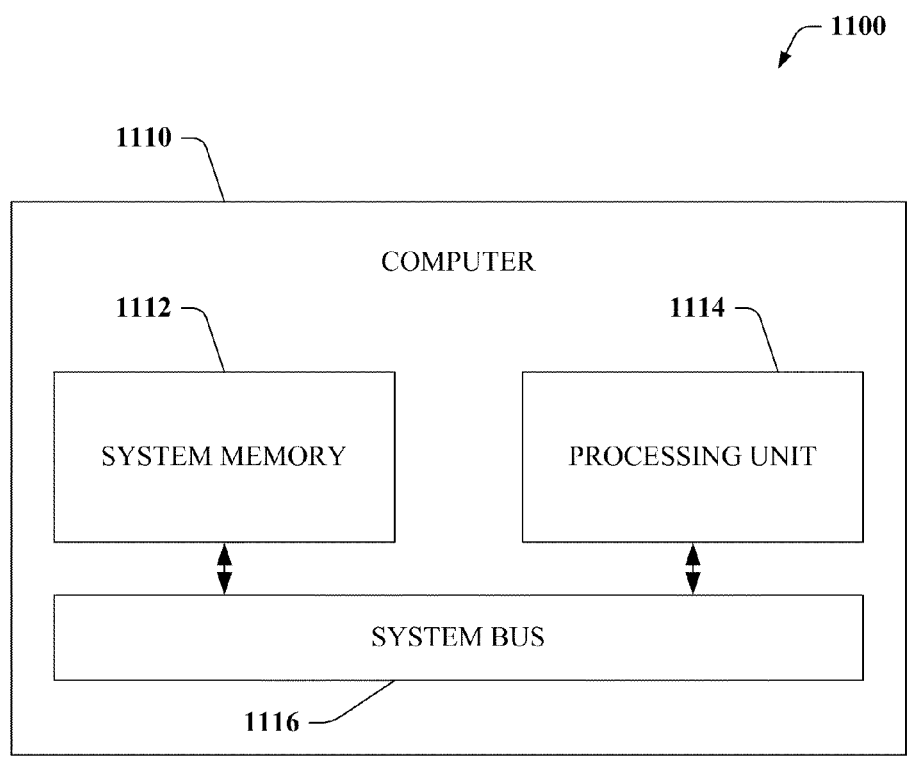
FIG. 11 illustrates an exemplary operating environment that facilitates the systems, apparatus, and methods described herein.

FIG. 11 illustrates an exemplary operating environment that facilitates the systems, apparatus and methods described herein. In order to provide additional context for various aspects of the embodiments described herein, FIG. 11 and the following discussion are intended to provide a brief, general description of a computing environment 1100 in which the various aspects described herein can be implemented. While the description above is in the general context of computer-executable instructions that can run on one or more computers, those skilled in the art will recognize that the claimed subject matter also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects of the claimed subject matter can also be practiced in distributed computing environments where certain tasks are performed by remote processing devices that are linked through a communications network. In a distributed computing environment, program modules can be located in both local and remote memory storage devices.

A computer typically includes a variety of computer-readable storage media. Computer-readable storage media can be any available media that can be accessed by the computer and includes both volatile and non-volatile media, removable and non-removable media. By way of example, and not limitation, computer-readable storage media can comprise computer storage media and communication media. Computer storage media includes both volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of communication media derived from computer-readable storage media and capable of subsequently propagating through electrically conductive media, (e.g., such as a system bus, microprocessor, data port, and the like) and/or non-electrically conductive media (e.g., in the form of radio frequency microwave frequency, optical frequency and similar electromagnetic frequency modulated data signals).

With reference to FIG. 1, in some embodiments, a computer-readable storage medium storing computer-executable instructions can be provided. The computer-executable instructions can be those that, if executed on a processor, cause the processor to display social media information generated for an entity on a UI. In some embodiments, the social media information is provided from a first application component such as social media component 120. Displaying the social media information, by the UI, can be in response to an AIC 122 receiving a signal indicative of a selection of the entity. The selection can be made from a second application that can be provided by a second application component. The second application can be, for example, the messaging component 116 or the contacts component 118.

The AIC 122 can then integrate the first application and the second application in response to receiving the signal. Integrating the first application and the second application can include any steps that result in social media information about the entity being generated.

The social media information can include information from one or more social networking websites. Further, the social media information generated for the entity can differ in content and/or type from the information indicative of the entity. By way of example, but not limitation, the social media information can include wall postings, news feeds, blogs and/or any social media information related thereto, as described herein. By contrast, in some embodiments, the information indicative of the entity can include contact-related information including such as a name or telephone number or email address of a contact. Accordingly, one or more of the embodiments described herein can include generating social media information that includes one or more textual, graphical, pictorial and/or video elements that differ from the textual, graphical, pictorial and/or video elements in the information indicative of the entity.

The computer-readable storage medium can also store computer-executable instructions that, if executed on the processor 124, cause the processor 124 to configure the UI. In some embodiments, the UI can be configured to include a plurality of display regions including a leftmost display region, a rightmost display region and a middle display region between the leftmost display region and the rightmost display region. The UI can be configured to display the leftmost display region, the rightmost display region and the middle display region as non-overlapping regions and/or in non-concurrent time intervals. In some embodiments, the UI and operation thereof can be as shown and described with reference to FIGS. 2 and 6.

In some embodiments, the UI can be configured to display the social media information about the entity on a first one of the leftmost display region, the rightmost display region or the middle display region, and display the information indicative of the entity on a second one of the leftmost display region, the rightmost display region or the middle display region. The first display region can be different from the second display region in some embodiments.

The computer-readable storage medium can also store computer-executable instructions that, if executed on the processor 124, cause the processor 124 to associate a first region of the UI with an unlocked state of the UI; receive a signal indicative of an input gesture in the first region of the UI; and unlock the UI in response to receiving the signal indicative of the input gesture in the first region of the UI. In some embodiments, the UI can be as shown and described with reference to FIG. 7A or 7B.

The computer-readable storage medium can also store computer-executable instructions that, if executed on the processor 124, cause the processor 124 to associate a second region of the UI with a locked state of the UI. Prior to receiving the signal indicative of the input gesture in the first region of the UI, the processor 124 can receive a signal indicative of the input gesture in the second region of the UI. The input gesture can be provided in the second region and in the first region upon a swipe gesture from the second region to the first region being applied to the UI.

The computer-readable storage medium can also store computer-executable instructions that, if executed on the processor 124, cause the processor 124 to display a lock icon in the second region of the UI. In some embodiments, the processor 124 can display an arch in the first region of the UI. The input gesture can be received in the second region and in the first region upon a swipe gesture dragging the lock icon in the second region to the arch in the first region being applied to the UI. In some embodiments, the UI can be touch-sensitive.

Referring back to FIG. 11, the computing environment 1100 for implementing various aspects includes a computer 1110, the computer 1110 including a processing unit 1114, a system memory 1112 and a system bus 1116. The system bus 1116 couples system components including, but not limited to, the system memory 1112 to the processing unit 1114. The processing unit 1114 can be any of various commercially available processors, such a single core processor, a multi-core processor, or any other suitable arrangement of processors. The system bus 1116 can be any of several types of bus structure that can further interconnect to a memory bus (with or without a memory controller), a peripheral bus, and a local bus using any of a variety of commercially available bus architectures. The system memory 1112 can include read-only memory (ROM), random access memory (RAM), high-speed RAM (such as static RAM), EPROM, EEPROM, and/or the like. Additionally or alternatively, the computer 1102 can include a hard disk drive, upon which program instructions, data, and the like can be retained. Moreover, removable data storage can be associated with the computer 1102. Hard disk drives, removable media, computer-readable storage media, etc. can be communicatively coupled to the processing unit 1114 by way of the system bus 1116.

The system memory 1112 can retain a number of program modules, such as an operating system, one or more application programs, other program modules, and program data. All or portions of an operating system, applications, modules, and/or data can be, for instance, cached in RAM, retained upon a hard disk drive, or any other suitable location. A user can enter commands and information into the computer 1110 through one or more wired/wireless input devices, such as a keyboard, pointing and clicking mechanism, pressure sensitive screen, microphone, joystick, stylus pen, etc. A monitor or other type of interface can also be connected to the system bus 1116.

The computer 1110 can operate in a networked environment using logical connections via wired and/or wireless communications to one or more remote computers, phones, or other computing devices, such as workstations, server computers, routers, personal computers, portable computers, microprocessor-based entertainment appliances, peer devices or other common network nodes, etc. The computer 1110 can connect to other devices/networks by way of antenna, port, network interface adaptor, wireless access point, modem, and/or the like.

The computer 1110 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least WiFi and Bluetooth™ wireless technologies. Thus, the communication can be a predefined structure as with a conventional network or simply an ad hoc communication between at least two devices.

WiFi, or Wireless Fidelity, allows connection to the Internet from a couch at home, a bed in a hotel room, or a conference room at work, without wires. WiFi is a wireless technology similar to that used in a cell phone that enables such devices, e.g., computers, to send and receive data indoors and out, anywhere within the range of a base station. WiFi networks use radio technologies called IEEE 802.11 (a, b, g, etc.) to provide secure, reliable, fast wireless connectivity. A WiFi network can be used to connect computers to each other, to the Internet, and to wired networks (which use IEEE 802.3 or Ethernet). WiFi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 12:
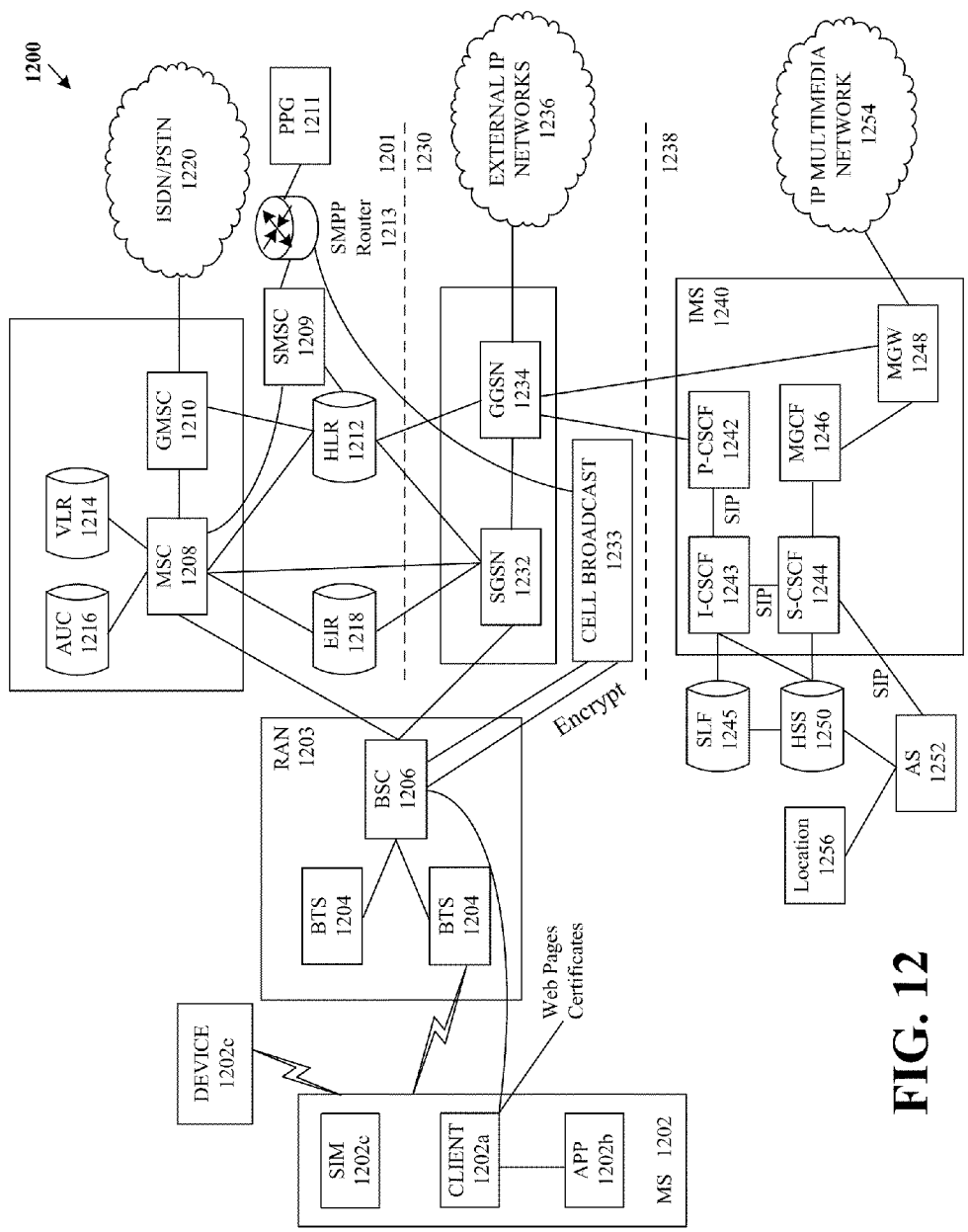
FIG. 12 illustrates an exemplary network environment that facilitates the systems, apparatus, and methods described herein.

FIG. 12 illustrates an exemplary network environment that facilitates the systems, apparatus and methods described herein. FIG. 12 depicts a GSM/GPRS/IP multimedia network architecture 1200 that includes a GSM core network 1201, a GPRS network 1230 and an IP multimedia network 1238. The GSM core network 1201 includes a Mobile Station (MS) 1202, at least one Base Transceiver Station (BTS) 1204 and a Base Station Controller (BSC) 1206. The MS 1202 is physical equipment or Mobile Equipment (ME), such as a mobile phone or a laptop computer that is used by mobile subscribers, with a Subscriber identity Module (SIM) 1202c. The SIM 1202c includes an International Mobile Subscriber Identity (IMSI), which is a unique device identifier of a subscriber. The MS 1202 includes an embedded client 1202a that receives and processes messages received by the MS 1202. The embedded client 1202a can be implemented in JAVA and is discuss more fully below.

The embedded client 1202a communicates with an application 1202b that provides services and/or information to an end user. One example of the application can be navigation software that provides near real-time traffic information that is received via the embedded client 1202a to the end user. The navigation software can provide road conditions, suggest alternate routes, etc. based on the location of the MS 1202. Those of ordinary skill in the art understand that there are many different methods and systems of locating an MS 1202.

Alternatively, the MS 1202 and a device 1202c can be enabled to communicate via a short-range wireless communication link, such as Bluetooth™ For example, a Bluetooth™ SIM Access Profile can be provided in an automobile (e.g., device 1202c) that communicates with the SIM 1202c in the MS 1202 to enable the automobile's communications system to pull information from the MS 1202. The Bluetooth™ communication system in the vehicle becomes an "embedded phone" that employs an antenna associated with the automobile. The result is improved reception of calls made in the vehicle. As one of ordinary skill in the art would recognize, an automobile is one example of the device 1202c. There can be an endless number of devices 1202c that use the SIM within the MS 1202 to provide services, information, data, audio, video, etc. to end users.

The BTS 1204 is physical equipment, such as a radio tower, that enables a radio interface to communicate with the MS. Each BTS can serve more than one MS. The BSC 1206 manages radio resources, including the BTS. The BSC can be connected to several BTSs. The BSC and BTS components, in combination, are generally referred to as a base station (BSS) or radio access network (RAN) 1203.

The GSM core network 1201 also includes a Mobile Switching Center (MSC) 1208, a Gateway Mobile Switching Center (GMSC) 1210, a Home Location Register (HLR) 1212, Visitor Location Register (VLR) 1214, an Authentication Center (AuC) 1218, and an Equipment Identity Register (EIR) 1216. The MSC 1208 performs a switching function for the network. The MSC also performs other functions, such as registration, authentication, location updating, handovers, and call routing. The GMSC 1210 provides a gateway between the GSM network and other networks, such as an Integrated Services Digital Network (ISDN) or Public Switched Telephone Networks (PSTNs) 1220. In other words, the GMSC 1210 provides interworking functionality with external networks.

The HLR 1212 is a database or component(s) that comprises administrative information regarding each subscriber registered in a corresponding GSM network. The HLR 1212 also includes the current location of each MS. The VLR 1214 is a database or component(s) that contains selected administrative information from the HLR 1212. The VLR contains information necessary for call control and provision of subscribed services for each MS currently located in a geographical area controlled by the VLR. The HLR 1212 and the VLR 1214, together with the MSC 1208, provide the call routing and roaming capabilities of GSM. The AuC 1216 provides the parameters needed for authentication and encryption functions. Such parameters allow verification of a subscriber's identity. The EIR 1218 stores security-sensitive information about the mobile equipment.

A Short Message Service Center (SMSC) 1209 allows one-to-one Short Message Service (SMS) messages to be sent to/from the MS 1202. A Push Proxy Gateway (PPG) 1211 is used to "push" (e.g., send without a synchronous request) content to the MS 1202. The PPG 1211 acts as a proxy between wired and wireless networks to facilitate pushing of data to the MS 1202. A Short Message Peer to Peer (SMPP) protocol router 1213 is provided to convert SMS-based SMPP messages to cell broadcast messages. SMPP is a protocol for exchanging SMS messages between SMS peer entities such as short message service centers. It is often used to allow third parties, e.g., content suppliers such as news organizations, to submit bulk messages.

To gain access to GSM services, such as speech, data, and short message service (SMS), the MS first registers with the network to indicate its current location by performing a location update and IMSI attach procedure. The MS 1202 sends a location update including its current location information to the MSC/VLR, via the BTS 1204 and the BSC 1206. The location information is then sent to the MS's HLR. The HLR is updated with the location information received from the MSC/VLR. The location update also is performed when the MS moves to a new location area. Typically, the location update is periodically performed to update the database as location-updating events occur.

The GPRS network 1230 is logically implemented on the GSM core network architecture by introducing two packet-switching network nodes, a serving GPRS support node (SGSN) 1232, a cell broadcast and a Gateway GPRS support node (GGSN) 1234. The SGSN 1232 is at the same hierarchical level as the MSC 1208 in the GSM network. The SGSN controls the connection between the GPRS network and the MS 1202. The SGSN also keeps track of individual MS's locations and security functions and access controls.

A Cell Broadcast Center (CBC) 1233 communicates cell broadcast messages that are typically delivered to multiple users in a specified area. Cell Broadcast is one-to-many geographically focused service. It enables messages to be communicated to multiple mobile phone customers who are located within a given part of its network coverage area at the time the message is broadcast.

The GGSN 1234 provides a gateway between the GPRS network and a public packet network (PDN) or other IP networks 1236. In embodiments, the GGSN provides interworking functionality with external networks, and sets up a logical link to the MS through the SGSN. When packet-switched data leaves the GPRS network, it is transferred to an external TCP-IP network 1236, such as an X.25 network or the Internet. In order to access GPRS services, the MS first attaches itself to the GPRS network by performing an attach procedure. The MS then activates a packet data protocol (PDP) context, thus activating a packet communication session between the MS, the SGSN, and the GGSN.

In a GSM/GPRS network, GPRS services and GSM services can be used in parallel. The MS can operate in one three classes: class A, class B, and class C. A class A MS can attach to the network for both GPRS services and GSM services simultaneously. A class A MS also supports simultaneous operation of GPRS services and GSM services. For example, class A mobiles can receive GSM voice/data/SMS calls and GPRS data calls at the same time. A class B MS can attach to the network for both GPRS services and GSM services simultaneously. However, a class B MS does not support simultaneous operation of the GPRS services and GSM services. That is, a class B MS can only use one of the two services at a given time. A class C MS can attach for only one of the GPRS services and GSM services at a time. Simultaneous attachment and operation of GPRS services and GSM services is not possible with a class C MS.

A GPRS network 1230 can be designed to operate in three network operation modes (NOM1, NOM2 and NOM3). A network operation mode of a GPRS network is indicated by a parameter in system information messages transmitted within a cell. The system information messages dictates a MS where to listen for paging messages and how signal towards the network. The network operation mode represents the capabilities of the GPRS network. In a NOM1 network, a MS can receive pages from a circuit switched domain (e.g., voice call) when engaged in a data call. The MS can suspend the data call or take both simultaneously, depending on the ability of the MS. In a NOM2 network, a MS cannot receive pages from a circuit switched domain when engaged in a data call, since the MS is receiving data and is not listening to a paging channel. In a NOM3 network, a MS can monitor pages for a circuit switched network while received data and vice versa.

The IP multimedia network 1238 was introduced with 3GPP Release 5, and includes an IP multimedia subsystem (IMS) 1240 to provide rich multimedia services to end users. A representative set of the network entities within the IMS 1240 are a call/session control function (CSCF), a media gateway control function (MGCF) 1246, a media gateway (MGW) 1248, and a master subscriber database, called a home subscriber server (HSS) 1250. The HSS 1250 can be common to the GSM network 1201, the GPRS network 1230 as well as the IP multimedia network 1238.

The IP multimedia system 1240 is built around the call/session control function, of which there are three types: an interrogating CSCF (I-CSCF) 1243, a proxy CSCF (P-CSCF) 1242, and a serving CSCF (S-CSCF) 1244. The P-CSCF 1242 is the MS's first point of contact with the IMS 1240. The P-CSCF 1242 forwards session initiation protocol (SIP) messages received from the MS to an SIP server in a home network (and vice versa) of the MS. The P-CSCF 1242 can also modify an outgoing request according to a set of rules defined by the network operator (e.g., address analysis and potential modification).

The I-CSCF 1243 forms an entrance to a home network and hides the inner topology of the home network from other networks and provides flexibility for selecting an S-CSCF. The I-CSCF 1243 can contact a subscriber location function (SLF) 1245 to determine which HSS 1250 to use for the particular subscriber, if multiple HSS 1250 are present. The S-CSCF 1244 performs the session control services for the MS 1202. This includes routing originating sessions to external networks and routing terminating sessions to visited networks. The S-CSCF 1244 also decides whether an application server (AS) 1252 is required to receive information on an incoming SIP session request to ensure appropriate service handling. This decision is based on information received from the HSS 1250 (or other sources, such as an application server 1252). The AS 1252 also communicates to a location server 1256 (e.g., a Gateway Mobile Location Center (GMLC)) that provides a position (e.g., latitude/longitude coordinates) of the MS 1202.

The HSS 1250 contains a subscriber profile and keeps track of which core network node is currently handling the subscriber. It also supports subscriber authentication and authorization functions (AAA). In networks with more than one HSS 1250, a subscriber location function provides information on the HSS 1250 that contains the profile of a given subscriber.

The MGCF 1246 provides interworking functionality between SIP session control signaling from the IMS 1240 and ISUP/BICC call control signaling from the external GSTN networks (not shown). It also controls the media gateway (MGW) 1248 that provides user-plane interworking functionality (e.g., converting between AMR- and PCM-coded voice). The MGW 1248 also communicates with other IP multimedia networks 1254.

In some embodiments, the IP networks 1236 described herein include networks communicatively coupled to social networking sites. As such, the networks disclosed herein can also include such IP networks 1236 and one or more social networking sites.

What has been described above includes embodiments of claimed subject matter. It is, of course, not possible to describe every conceivable combination of components or methodologies for purposes of describing the claimed subject matter. However, one of ordinary skill in the art can recognize that many further combinations and permutations of such subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A non-transitory machine-readable storage medium, comprising executable instructions that, when executed by a processor, facilitate performance of operations, comprising:
    facilitating, via a first screen of the device, display of first information associated with a first application and having a first level of detail;
    in response to detection of an input to the device, facilitating replacement of the first screen being displayed with a second screen of the device, wherein the second screen comprises second information about an entity and is generated by the first application, and wherein the second information comprises a second level of detail greater than the first level of detail;
    facilitating detection of a first gesture along a surface of a display device of the device during display of the second screen;
    facilitating movement of the second screen being displayed in a direction of the first gesture in conjunction with the detection of the first gesture until the second screen is no longer displayed;
    facilitating movement of a third screen onto the display device replacing the second screen, wherein the third screen comprises third information about the entity, wherein the third information is generated by a second application different from the first application,
    wherein the first type of application is different from the second type of application, wherein the first type of application is a social media application based on the direction being determined to be substantially right, wherein the first type of application is a contacts application based on the direction being determined to be substantially left, wherein the social media application is configured to generate aggregated social media information associated with the entity, and wherein the social media information comprises social media feed information displayed in chronological order;
    facilitating association of a first region of the first screen with an unlocked state of the first screen, wherein a defined shape is displayed in the first region;
    facilitating detection of receipt of a signal indicative of a second gesture in the first region of the first screen;
    facilitating update of the first screen to an unlocked status in response to the detection of the receipt of the signal indicative of the second gesture in the first region of the first screen; and
    facilitating cessation of display of a lock icon via the first screen in response to the update of the first screen to the unlocked state.

2. The non-transitory machine-readable storage medium of claim 1, wherein the detection of the first gesture along the surface of the display device comprises detection of the first gesture along the surface of a touch-sensitive interface.

3. The non-transitory machine-readable storage medium of claim 1, wherein the contacts application is configured to generate residential information.

4. The non-transitory machine-readable storage medium of claim 3, wherein the residential information is associated with the entity.

5. The non-transitory machine-readable storage medium of claim 1, wherein the contacts application is configured to generate electronic mail information associated with the entity.

6. The non-transitory machine-readable storage medium of claim 1, wherein the entity comprises information representative of a group of persons.

7. The non-transitory machine-readable storage medium of claim 1, wherein the entity comprises a business entity.

8. An apparatus, comprising:
    a processor; and
        a memory that stores executable instructions that, when executed by the processor, facilitate performance of operations, comprising:
    facilitating, via a first screen of the apparatus, display of first information associated with a first application and having a first level of detail;
    in response to detection of an input to the apparatus, facilitating replacement of the first screen being displayed with a second screen of the apparatus, wherein the second screen comprises second information about an entity and is generated by the first application, and wherein the second information comprises a second level of detail greater than the first level of detail;
    facilitating detection of a first gesture along a surface of a display device of the apparatus during display of the second screen;
    facilitating movement of the second screen being displayed in a direction of the first gesture in conjunction with the detection of the first gesture until the second screen is no longer displayed;
    facilitating movement of a third screen onto the display device replacing the second screen, wherein the third screen comprises third information about the entity, wherein the third information is generated by a second application different from the first application,
    wherein the first type of application is different from the second type of application, wherein the first type of application is a social media application based on the direction being determined to be substantially left, wherein the first type of application is a contacts application based on the direction being determined to be substantially right, wherein the social media application is configured to generate aggregated social media information associated with the entity, and wherein the social media information comprises social media feed information displayed in chronological order;

facilitating association of a first region of the first screen with a first state of the first screen, wherein a defined shape is displayed in the first region;

facilitating detection of receipt of a signal indicative of a second gesture in the first region of the first screen;

facilitating update of the first screen to a second state in response to the detection of the receipt of the signal indicative of the second gesture in the first region of the first screen; and facilitating cessation of display of a defined icon via the first screen in response to the update of the first screen to the first state, wherein the first state and the second state are associated with whether the first screen is locked.

9. The apparatus of claim 8, wherein the detection of the first gesture along the surface of the display device comprises detection of the first gesture along the surface of a touch-sensitive interface.

10. The apparatus of claim 8, wherein the contacts application is configured to generate residential information associated with the entity.

11. The apparatus of claim 8, wherein the social media application is configured to generate filtered social media information associated with the entity, and wherein the social media information comprises blog information.

12. A method, comprising:

facilitating, via a first screen of an apparatus comprising a processor, display of first information associated with a first application and having a first level of detail;

in response to detection of an input to the apparatus, facilitating, by the apparatus, replacement of the first screen being displayed with a second screen of the apparatus, wherein the second screen comprises second information about an entity and is generated by the first application, and wherein the second information comprises a second level of detail greater than the first level of detail;

facilitating, by the apparatus, detection of a first gesture along a display device of the apparatus during display of the second screen;

facilitating, by the apparatus, movement of the second screen being displayed in a direction of the first gesture in conjunction with the detection of the first gesture until the second screen is no longer displayed;

facilitating, by the apparatus, movement of a third screen onto the display device replacing the second screen, wherein the third screen comprises third information about the entity, wherein the third information is generated by a second application different from the first application, wherein the first type of application is different from the second type of application, wherein the first type of application is a social media application based on the direction being determined to be substantially right, wherein the first type of application is a contacts application based on the direction being determined to be substantially left, wherein the social media application is configured to generate aggregated social media information associated with the entity, and wherein the social media information comprises social media feed information displayed in chronological order;

facilitating, by the apparatus, association of a first region of the screen with a first state of the first screen associated with an unlocked status of the first screen;

facilitating, by the apparatus, detection of receipt of a signal indicative of a second gesture in the first region of the first screen;

facilitating, by the apparatus, update of the first screen to the unlocked status in response to the detection of the receipt of the signal indicative of the second gesture in the first region of the first screen; and facilitating, by the apparatus, cessation of display of a defined icon via the first screen in response to the update of the first screen to the first state.

13. The method of claim 12, wherein the detection of the first gesture on the display device comprises detection of the first gesture on a touch-sensitive interface.

14. The method of claim 12, wherein the social media application is configured to generate comment information associated with a social media feed.

15. The method of claim 12, wherein the social media application is configured to generate filtered social media information associated with the entity.

16. The method of claim 15, wherein the social media information further comprises chat information.

17. The method of claim 12, wherein the social media application is configured to generate news feed information.

18. The method of claim 12, wherein the entity comprises information representative of a group comprising a legal person and a natural person.

19. The method of claim 12, wherein the entity comprises an organization.

20. The method of claim 12, wherein the social media application is configured to generate video social media information.

* * * * *